US012220859B2

(12) United States Patent
Hashimoto et al.

(10) Patent No.: US 12,220,859 B2
(45) Date of Patent: *Feb. 11, 2025

(54) THREE-DIMENSIONAL SHAPING DEVICE AND METHOD FOR MANUFACTURING THREE-DIMENSIONAL SHAPED OBJECT

(71) Applicant: Seiko Epson Corporation, Tokyo (JP)

(72) Inventors: Taki Hashimoto, Shiojiri (JP); Kohei Yuwaki, Tsukuba (JP); Atsushi Majima, Matsumoto (JP)

(73) Assignee: SEIKO EPSON CORPORATION (JP)

( * ) Notice: Subject to any disclaimer, the term of this patent is extended or adjusted under 35 U.S.C. 154(b) by 370 days.

This patent is subject to a terminal disclaimer.

(21) Appl. No.: 17/719,662

(22) Filed: Apr. 13, 2022

(65) Prior Publication Data

US 2022/0234280 A1 Jul. 28, 2022

Related U.S. Application Data

(62) Division of application No. 16/912,260, filed on Jun. 25, 2020, now Pat. No. 11,413,809.

(30) Foreign Application Priority Data

Jun. 28, 2019 (JP) .................................. 2019-120736

(51) Int. Cl.
*B29C 64/118* (2017.01)
*B29C 64/209* (2017.01)
(Continued)

(52) U.S. Cl.
CPC .......... *B29C 64/118* (2017.08); *B29C 64/209* (2017.08); *B29C 64/241* (2017.08);
(Continued)

(58) Field of Classification Search
CPC ... B29C 64/118; B29C 64/209; B29C 64/241; B29C 64/295; B29C 64/314; B29C 64/321; B29C 64/343; B29C 64/393; B33Y 30/00
See application file for complete search history.

(56) References Cited

U.S. PATENT DOCUMENTS 2,871,516 A 2/1959 Sherman et al.
4,107,246 A 8/1978 LaSpisa
(Continued)

FOREIGN PATENT DOCUMENTS

CN 103878979 A 6/2014
CN 104290325 A 1/2015
(Continued)

*Primary Examiner* — Nahida Sultana
*Assistant Examiner* — Mohamed K Ahmed Ali
(74) *Attorney, Agent, or Firm* — Harness, Dickey & Pierce, P.L.C.

(57) ABSTRACT

A three-dimensional shaping device includes a plasticization unit configured to plasticize a material into a shaping material using a rotating screw; a drive unit configured to rotate the screw; a supply flow path through which the shaping material flows; a nozzle configured to discharge the shaping material; a discharge amount adjusting mechanism configured to switch between stop and restart of discharge of the shaping material from the nozzle by a valve portion provided in the supply flow path; a pressure measuring portion configured to measure a pressure of the shaping material in the supply flow path between the plasticization unit and the valve portion; and a control unit configured to adjust rotation of the screw by controlling the drive unit according to a measured value of the pressure which is measured. The control unit controls the drive unit under a first control during a period when the discharge of the shaping material from the nozzle is not stopped, and controls the drive unit under a second control during a period when (Continued)

the discharge of the shaping material from the nozzle is stopped, and a degree of adjustment of the rotation of the screw under the second control is smaller than a degree of adjustment of the rotation of the screw under the first control.

12 Claims, 12 Drawing Sheets

(51) Int. Cl.
    *B29C 64/241* (2017.01)
    *B29C 64/245* (2017.01)
    *B29C 64/295* (2017.01)
    *B29C 64/314* (2017.01)
    *B29C 64/321* (2017.01)
    *B29C 64/343* (2017.01)
    *B29C 64/35* (2017.01)
    *B29C 64/393* (2017.01)
    *B33Y 10/00* (2015.01)
    *B33Y 30/00* (2015.01)
    *B33Y 50/02* (2015.01)

(52) U.S. Cl.
    CPC .......... *B29C 64/245* (2017.08); *B29C 64/295* (2017.08); *B29C 64/314* (2017.08); *B29C 64/321* (2017.08); *B29C 64/343* (2017.08); *B29C 64/393* (2017.08); *B29C 64/35* (2017.08); *B33Y 10/00* (2014.12); *B33Y 30/00* (2014.12); *B33Y 50/02* (2014.12)

(56) References Cited

U.S. PATENT DOCUMENTS

| | | | |
|---|---|---|---|
| 4,721,589 A | 1/1988 | Harris | |
| 5,121,329 A | 6/1992 | Crump | |
| 5,260,009 A | 11/1993 | Penn | |
| 5,303,141 A | 4/1994 | Batchelder et al. | |
| 5,340,433 A | 8/1994 | Crump | |
| 5,402,351 A | 3/1995 | Batchelder et al. | |
| 5,633,021 A | 5/1997 | Brown et al. | |
| 5,747,077 A | 5/1998 | Yoshida et al. | |
| 6,019,916 A | 2/2000 | Mizuguchi et al. | |
| 6,401,001 B1 | 6/2002 | Jang et al. | |
| 6,578,596 B1 | 6/2003 | Batchelder et al. | |
| 7,874,825 B2 | 1/2011 | Khoshnevis | |
| 10,254,499 B1 | 4/2019 | Cohen et al. | |
| 10,981,332 B2 | 4/2021 | Chanclon et al. | |
| 11,034,087 B2 | 6/2021 | Saito et al. | |
| 11,077,619 B2 | 8/2021 | Yuwaki et al. | |
| 11,161,297 B2 | 11/2021 | Tyler et al. | |
| 11,413,809 B2 | 8/2022 | Hashimoto et al. | |
| 11,446,865 B2 | 9/2022 | Streicher et al. | |
| 2005/0015171 A1 | 1/2005 | Cruz-Uribe et al. | |
| 2005/0015175 A1 | 1/2005 | Huang | |
| 2007/0138678 A1 | 6/2007 | Khoshnevis | |
| 2013/0141491 A1 | 6/2013 | Krichtman et al. | |
| 2014/0252668 A1 | 9/2014 | Austin et al. | |
| 2016/0046073 A1 | 2/2016 | Hadas | |
| 2016/0082653 A1 | 3/2016 | Ohnishi | |
| 2017/0008230 A1 | 1/2017 | Yuyama | |
| 2017/0157820 A1 | 6/2017 | Ward et al. | |
| 2017/0157831 A1 | 6/2017 | Mandel et al. | |
| 2017/0157844 A1 | 6/2017 | Mandel et al. | |
| 2017/0203506 A1 | 7/2017 | Hjelsand et al. | |
| 2017/0203507 A1 | 7/2017 | Leavitt et al. | |
| 2017/0210069 A1 | 7/2017 | Stubenruss | |
| 2017/0210074 A1 | 7/2017 | Ueda et al. | |
| 2017/0232681 A1 | 8/2017 | Xu et al. | |
| 2017/0291364 A1 | 10/2017 | Womer | |
| 2017/0297107 A1 | 10/2017 | Oka et al. | |
| 2018/0169941 A1 | 6/2018 | Taniguchi et al. | |
| 2018/0200955 A1 | 7/2018 | Hoelldorfer et al. | |
| 2018/0311894 A1 | 11/2018 | Saito et al. | |
| 2018/0326657 A1 | 11/2018 | Iwase | |
| 2018/0348247 A1 | 12/2018 | Ando | |
| 2019/0022934 A1 | 1/2019 | Kobe et al. | |
| 2019/0022940 A1 | 1/2019 | Hofmann et al. | |
| 2019/0030811 A1 | 1/2019 | Gasso et al. | |
| 2019/0030820 A1 | 1/2019 | Saito et al. | |
| 2019/0061243 A1 | 2/2019 | Saito et al. | |
| 2019/0076924 A1 | 3/2019 | Jepeal et al. | |
| 2019/0168446 A1 | 6/2019 | Leibig et al. | |
| 2019/0217546 A1 | 7/2019 | Bosveld et al. | |
| 2019/0315114 A1 | 10/2019 | Hjelsand et al. | |
| 2019/0375003 A1 | 12/2019 | Mark | |
| 2020/0016833 A1 | 1/2020 | Yuwaki et al. | |
| 2020/0016834 A1 | 1/2020 | Yuwaki et al. | |
| 2020/0094479 A1 | 3/2020 | Yamasaki et al. | |
| 2020/0094480 A1 | 3/2020 | Yamasaki | |
| 2020/0164575 A1 | 5/2020 | Yuwaki et al. | |
| 2020/0198240 A1 | 6/2020 | Hashimoto et al. | |
| 2020/0207017 A1 | 7/2020 | Yuwaki et al. | |
| 2020/0230942 A1 | 7/2020 | Gasso et al. | |
| 2020/0269515 A1 | 8/2020 | Takahashi | |
| 2020/0406548 A1 | 12/2020 | Yuwaki et al. | |
| 2021/0039306 A1 | 2/2021 | Busbee | |
| 2021/0154910 A1 | 5/2021 | Cheng et al. | |
| 2021/0162663 A1 | 6/2021 | Saito et al. | |
| 2021/0206065 A1 | 7/2021 | Saito et al. | |
| 2021/0387410 A1 | 12/2021 | Moore et al. | |
| 2021/0402687 A1 | 12/2021 | Anegawa et al. | |
| 2022/0032536 A1 | 2/2022 | Anegawa et al. | |
| 2022/0118524 A1 | 4/2022 | Nakamura et al. | |
| 2022/0134438 A1 | 5/2022 | Yamazaki | |
| 2022/0234280 A1 | 7/2022 | Hashimoto et al. | |

FOREIGN PATENT DOCUMENTS

| | | | |
|---|---|---|---|
| CN | 204622625 U | | 9/2015 |
| CN | 105172143 A | | 12/2015 |
| CN | 105291442 A | | 2/2016 |
| CN | 106573405 A | | 4/2017 |
| CN | 106853683 A | | 6/2017 |
| CN | 107336435 A | | 11/2017 |
| CN | 108790155 A | | 11/2018 |
| CN | 109421269 A | | 3/2019 |
| CN | 109605745 A | | 4/2019 |
| EP | 3 437 837 A1 | | 2/2019 |
| JP | H03-158228 A | | 7/1991 |
| JP | H05-345359 A | | 12/1993 |
| JP | H06-179243 A | | 6/1994 |
| JP | H07-096534 A | | 4/1995 |
| JP | H11-042712 A | | 2/1999 |
| JP | 2000-246780 A | | 9/2000 |
| JP | 2005-344765 A | | 12/2005 |
| JP | 2006-192710 A | | 7/2006 |
| JP | 2010-241016 A | | 10/2010 |
| JP | 2012131115 A | * | 7/2012 |
| JP | 2015-502870 A | | 1/2015 |
| JP | 2015-148309 A | | 8/2015 |
| JP | 2015-208879 A | | 11/2015 |
| JP | 2016-064539 A | | 4/2016 |
| JP | 2017-013351 A | | 1/2017 |
| JP | 2017-035811 A | | 2/2017 |
| JP | 2017-523934 A | | 8/2017 |
| JP | 2017-528340 A | | 9/2017 |
| JP | 2017-190505 A | | 10/2017 |
| JP | 2017-213735 A | | 12/2017 |
| JP | 2018-012221 A | | 1/2018 |
| JP | 2018-066056 A | | 4/2018 |
| JP | 2018-122454 A | | 8/2018 |
| JP | 2018-187777 A | | 11/2018 |
| JP | 2019-038157 A | | 3/2019 |
| JP | 2019-064090 A | | 4/2019 |
| JP | 2019-155691 A | | 9/2019 |
| JP | 2020-023189 A | | 2/2020 |
| JP | 2020-524092 A | | 8/2020 |
| WO | 2015/129733 A1 | | 9/2015 |
| WO | 2015-135434 A1 | | 9/2015 |
| WO | 2015-182675 A1 | | 12/2015 |
| WO | 2016/020150 A1 | | 2/2016 |

(56) References Cited

FOREIGN PATENT DOCUMENTS

| WO | 2016/185626 A1 | 11/2016 |
| WO | 2017-008789 A1 | 1/2017 |
| WO | 2017-038984 A1 | 3/2017 |
| WO | 2018/038751 A1 | 3/2018 |
| WO | 2018/210183 A1 | 11/2018 |

* cited by examiner

THREE-DIMENSIONAL SHAPING DEVICE AND METHOD FOR MANUFACTURING THREE-DIMENSIONAL SHAPED OBJECT

This application is a divisional of U.S. patent application Ser. No. 16/912,260 filed Jun. 25, 2020, which is based on, and claims priority from JP Application Serial Number 2019-120736, filed Jun. 28, 2019, the disclosures of which are hereby incorporated by reference herein in their entireties.

BACKGROUND

1. Technical Field

The present disclosure relates to a three-dimensional shaping device and a method for manufacturing a three-dimensional shaped object.

2. Related Art

For example, WO 2015/129733 discloses a three-dimensional shaping device including a cylinder having a nozzle for discharging molten resin, a screw disposed inside the cylinder, and a pressure gauge measuring pressure of the molten resin in a vicinity of the nozzle. In this three-dimensional shaping device, a motor that rotates the screw is controlled based on a pressure value measured by the pressure gauge so that the molten resin is stably discharged from the nozzle.

In order to shape a shaped object with high dimensional accuracy, it is preferable that start and stop of the discharge of a molten material from the nozzle can be switched in addition to stabilizing an amount of the molten material discharged from the nozzle, as in the device described above. The inventor of the present application has found that, in the device including a mechanism configured to switch between the start and stop of the discharge of the molten material from the nozzle, if the pressure value measured by the pressure gauge varies when the discharge of the molten material from the nozzle is stopped, rotation of the screw becomes unstable, and when the discharge of the molten material from the nozzle is restarted, it may be difficult to stably discharge the molten material from the nozzle.

SUMMARY

According to one aspect of the present disclosure, a three-dimensional shaping device is provided. The three-dimensional shaping device includes: a plasticization unit having a screw and configured to plasticize a material into a shaping material using the rotating screw; a drive unit configured to rotate the screw; a supply flow path communicating with the plasticization unit and through which the shaping material flows; a nozzle communicating with the supply flow path and configured to discharge the shaping material; a discharge amount adjusting mechanism having a valve portion provided in the supply flow path, and configured to switch between stop and restart of discharging of the shaping material from the nozzle by driving the valve portion; a pressure measuring portion configured to measure a pressure of the shaping material in the supply flow path between the plasticization unit and the valve portion; and a control unit configured to adjust rotation of the screw by controlling the drive unit according to a measured value of the pressure measured by the pressure measuring portion. The control unit controls the drive unit under a first control during a period when the discharging of the shaping material from the nozzle is not stopped by the discharge amount adjusting mechanism, and controls the drive unit under a second control during a period when the discharging of the shaping material from the nozzle is stopped by the discharge amount adjusting mechanism, and a degree of adjustment of the rotation of the screw under the second control is smaller than a degree of adjustment of the rotation of the screw under the first control.

DESCRIPTION OF EXEMPLARY EMBODIMENTS

A. First Embodiment

Figure 1:
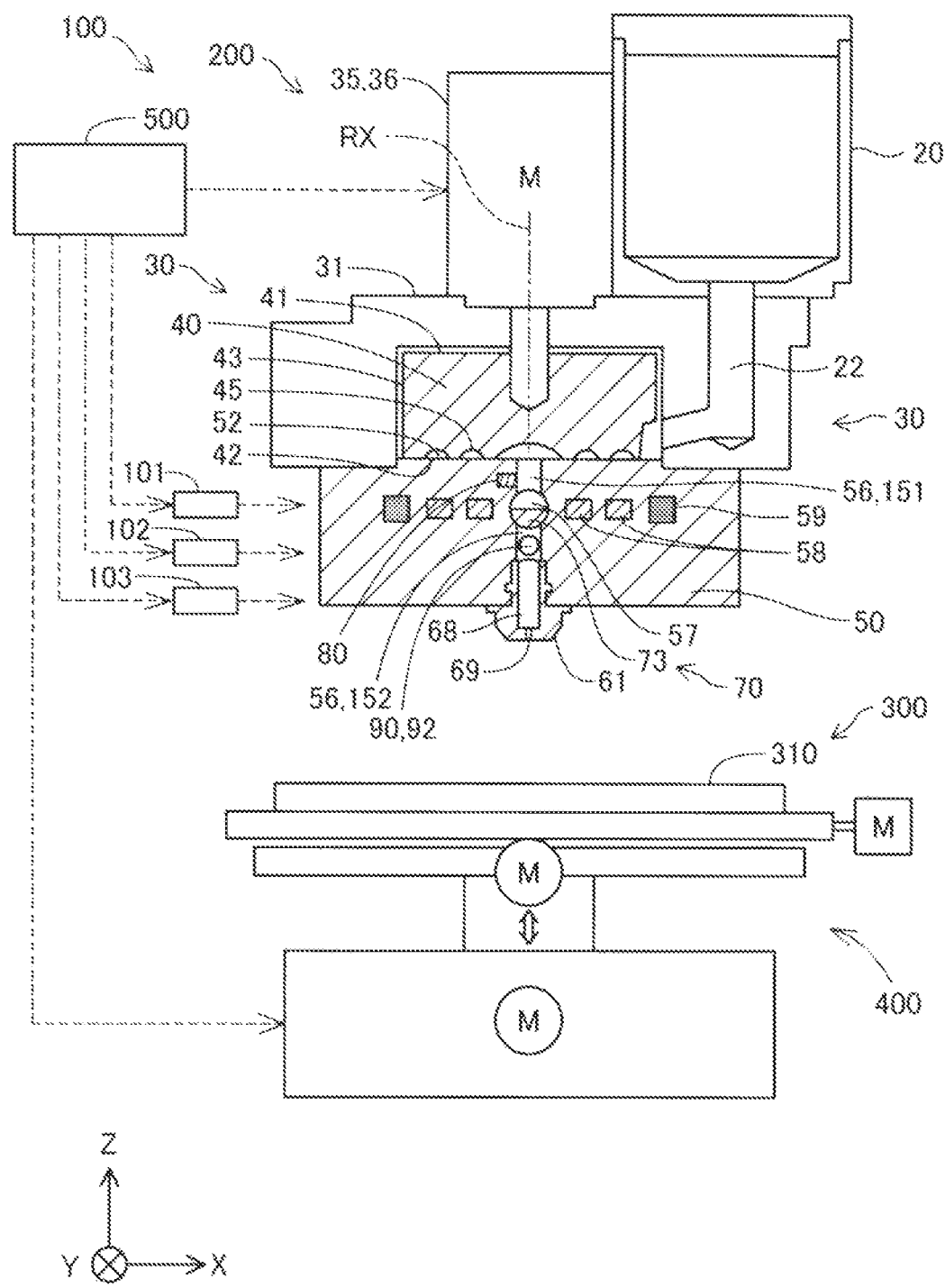
FIG. 1 is a diagram showing a schematic configuration of a three-dimensional shaping device according to a first embodiment.

FIG. 1 is a diagram showing a schematic configuration of a three-dimensional shaping device 100 according to a first embodiment. FIG. 1 shows arrows along X, Y, and Z directions orthogonal to each other. The X direction and the Y direction are directions along a horizontal direction, and the Z direction is a direction along a vertical direction. In other figures, the arrows along the X, Y, and Z directions are appropriately shown. The X, Y, Z directions in FIG. 1 and the X, Y, Z directions in other figures represent the same direction.

The three-dimensional shaping device 100 according to the present embodiment includes a shaping unit 200, a stage 300, a moving mechanism 400, and a control unit 500. Under control of the control unit 500, the three-dimensional shaping device 100 shapes a three-dimensional shaped object in which layers of a shaping material are stacked on a shaping surface 310 by driving the moving mechanism 400 to change a relative position between a nozzle hole 69 and the shaping surface 310 while discharging the shaping material from the nozzle hole 69 provided in the shaping unit 200 toward the shaping surface 310 of the stage 300. The shaping material is sometimes referred to as a molten material. A detailed configuration of the shaping unit 200 will be described later.

The moving mechanism 400 changes the relative position between the nozzle hole 69 and the shaping surface 310 as described above. According to the present embodiment, the moving mechanism 400 supports the stage 300, and changes the relative position between the nozzle hole 69 and the shaping surface 310 by moving the stage 300 with respect to the shaping unit 200. The moving mechanism 400 according to the present embodiment is implemented by a three-axis positioner that moves the stage 300 in three axial directions of the X, Y, and Z directions by drive forces of three motors. The motor is driven under the control of the control unit 500. The moving mechanism 400 may be configured to change the relative position between the nozzle hole 69 and the shaping surface 310 by, instead of moving the stage 300, moving the shaping unit 200 without moving the stage 300. In addition, the moving mechanism 400 may be configured to change the relative position between the nozzle hole 69 and the shaping surface 310 by moving both the stage 300 and the shaping unit 200.

The control unit 500 is implemented by a computer including one or more processors, a main storage device, and an input and output interface for inputting and outputting signals to and from an outside. According to the present embodiment, the control unit 500 controls operations of the shaping unit 200 and the moving mechanism 400 by the processor executing a program or a command read in the main storage device, so as to execute a shaping processing for shaping a three-dimensional shaped object. The operations include changing a three-dimensional relative position between the shaping unit 200 and the stage 300. The control unit 500 may be implemented by a combination of a plurality of circuits instead of a computer.

The shaping unit 200 includes a material supply unit 20 that is a supply source of a material, a drive unit 35, a plasticization unit 30 configured to plasticize the material supplied from the material supply unit 20 into a shaping material, a nozzle 61 having the nozzle hole 69 configured to discharge the shaping material supplied from the plasticization unit 30, a discharge amount adjusting mechanism 70 configured to adjust a flow rate of the shaping material discharged from the nozzle 61, a pressure measuring portion 80 configured to measure pressure of the shaping material, and a suction portion 90 configured to suck the shaping material. The "plasticization" means that a material having thermoplasticity is heated and melted. The "melting" also means that a material having thermoplasticity is softened by being heated to a temperature equal to or higher than a glass transition point, and exhibits fluidity.

A material in a state of pellets, powder, or the like is accommodated in the material supply unit 20. According to the present embodiment, a pellet-shaped ABS resin is used as the material. The material supply unit 20 according to the present embodiment is implemented by a hopper. Below the material supply unit 20, a supply path that couples the material supply unit 20 and the plasticization unit 30 is provided. The material supply unit 20 supplies the material to the plasticization unit 30 via the supply path 22.

According to the embodiment, the drive unit 35 includes a drive motor 36. The drive motor 36 is fixed to an upper surface of a screw case 31 to be described later. A rotation shaft of the drive motor 36 is coupled to an upper surface 41 of the flat screw 40 to be described later. The drive motor 36 is driven under the control of the control unit 500 to rotate the flat screw 40.

The plasticization unit 30 includes the screw case 31, the flat screw 40, and a barrel 50. The plasticization unit 30 melts at least a part of a solid-state material supplied from the material supply unit 20, converts the material into a paste-shaped shaping material having fluidity, and supplies the material to the nozzle 61.

The screw case 31 is a case for accommodating the flat screw 40. The barrel 50 is fixed to a lower surface of the screw case 31, and the flat screw 40 is accommodated in a space surrounded by the screw case 31 and the barrel 50.

The flat screw 40 has a substantially columnar shape whose height in a direction along a central axis RX is smaller than a diameter of the flat screw 40. The flat screw 40 is disposed in the screw case 31 such that the central axis RX is parallel to the Z direction. The flat screw 40 rotates around the central axis RX in the screw case 31 due to a torque generated by the drive motor 36. The flat screw 40 includes a groove forming surface 42 at which groove portions 45 are formed on a side opposite to the upper surface 41 in the direction along the central axis RX. A specific configuration of the flat screw 40 on a groove forming surface 42 side will be described later.

The barrel 50 is disposed below the flat screw 40. The barrel 50 includes a screw facing surface 52 that faces the groove forming surface 42 of the flat screw 40. The barrel 50 is provided with an opening portion at a center of the screw facing surface 52, a through hole 56 passing through the barrel 50 along the Z direction, and a cross hole 57 extending in the Y direction so as to intersect the through hole 56. The through hole 56 forms a flow path for supplying the shaping material to the nozzle 61. A specific configuration of the barrel 50 on a screw facing surface 52 side will be described later.

The barrel 50 is provided with a heater 58 for heating a material supplied to the groove portion 45 of the flat screw 40. According to the present embodiment, four rod-shaped heaters 58 are disposed along the Y direction. The heaters 58 are disposed below the screw facing surface 52. Temperatures of the heaters 58 are controlled by the control unit 500. The heater 58 may be referred to as a heating portion.

A refrigerant pipe 59 through which a refrigerant flows is provided in the barrel 50 at a position farther from the through hole 56 than the heater 58. The refrigerant pipe 59 is disposed so as to pass through a vicinity of an outer peripheral edge of the screw facing surface 52. The refrigerant pipe 59 is coupled to a refrigerant pump 103. The refrigerant pump 103 supplies the refrigerant to the refrigerant pipe 59. The refrigerant pump 103 is driven under the control of the control unit 500. As the refrigerant, for example, a liquid such as water or oil, or a gas such as carbon dioxide can be used. When the refrigerant flows through the refrigerant pipe 59, it is possible to prevent temperatures of the flat screw 40 and the barrel 50 from becoming too high. The refrigerant pipe 59 and the refrigerant pump 103 may be referred to as a cooling portion.

The discharge amount adjusting mechanism 70 includes a valve portion 73 provided in the cross hole 57 of the barrel 50, and a valve drive unit 101 configured to rotate the valve portion 73. The valve portion 73 adjusts the flow rate of the shaping material supplied to the nozzle 61 by rotating in the cross hole 57. The valve drive unit 101 is implemented by an actuator such as a stepping motor, and rotates the valve portion 73 under the control of the control unit 500. In a flow path of the shaping material formed in the barrel 50, a portion closer to the screw facing surface 52 than the valve portion 73 is referred to as a first flow path 151, and a portion farther from the screw facing surface 52 than the valve portion 73 is referred to as a second flow path 152. According to the present embodiment, in the through hole 56 of the barrel 50, the portion closer to the screw facing surface 52 than the valve portion 73 is referred to as the first flow path 151, and the portion farther from the screw facing surface 52 than the valve portion 73 is referred to as the second flow path 152. A specific configuration of the discharge amount adjusting mechanism 70 will be described later.

The pressure measuring portion 80 is provided in the first flow path 151. According to the present embodiment, the pressure measuring portion 80 is implemented by a pressure sensor. The pressure measuring portion 80 measures pressure of the shaping material in the first flow path 151. A pressure value of the shaping material measured by the pressure measuring portion 80 is transmitted to the control unit 500.

The suction portion 90 is coupled to the second flow path 152. The suction portion 90 sucks the shaping material from the second flow path 152. A specific configuration of the suction portion 90 will be described later.

The nozzle 61 is coupled to a lower surface of the barrel 50. The nozzle 61 is provided with a nozzle flow path 68 and the nozzle hole 69. The nozzle flow path 68 is a flow path provided in the nozzle 61. The nozzle flow path 68 is coupled to the second flow path 152. The nozzle hole 69 is a portion in which a flow path cross section provided at an end portion on a side of the nozzle flow path 68 communicating with atmosphere is reduced. The shaping material flowing into the nozzle flow path 68 from the second flow path 152 is discharged from the nozzle hole 69. The flow rate of the shaping material discharged from the nozzle holes 69 is adjusted by the discharge amount adjusting mechanism 70. A flow rate of the shaping material discharged from the nozzle 61 is also referred to as a discharge amount. According to the present embodiment, an opening shape of the nozzle hole 69 is a circle. A diameter of an opening portion of the nozzle hole 69 is referred to as a nozzle diameter Dn. An opening shape of the nozzle hole 69 is not limited to a circle, and may be a square or the like. When the opening shape of the nozzle hole 69 is a square, a length of one side of the square is referred to as the nozzle diameter Dn. The opening shape of the nozzle hole 69 may be a polygon other than the square.

Figure 2:
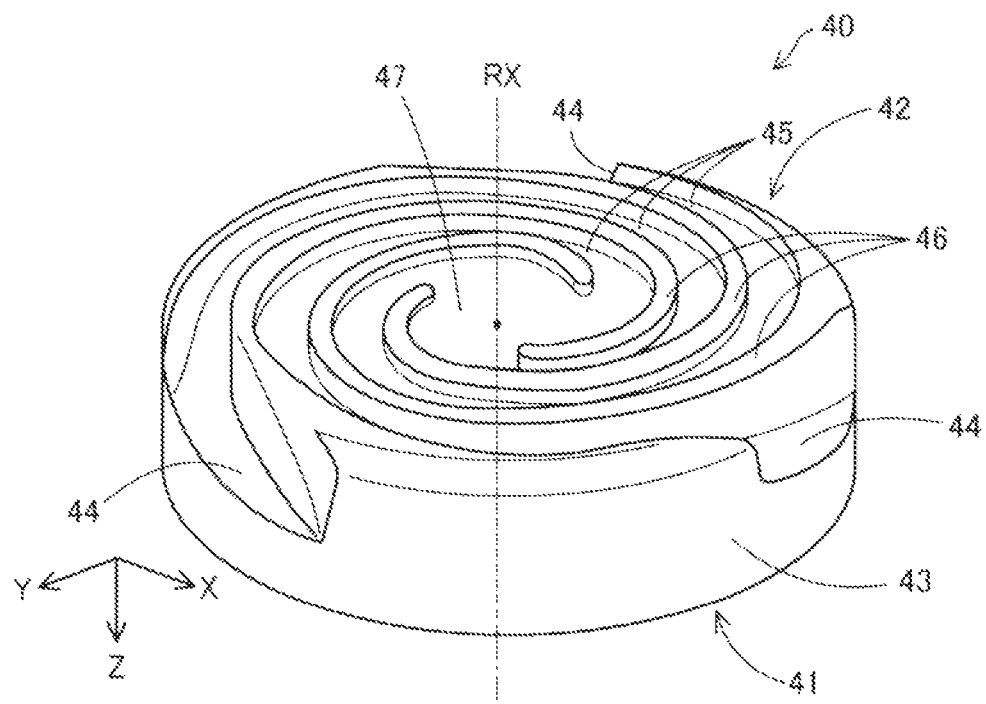
FIG. 2 is a schematic perspective view showing a configuration of a flat screw on a groove forming surface side.

FIG. 2 is a schematic perspective view showing the configuration of the flat screw 40 on the groove forming surface 42 side. In FIG. 2, a position of the central axis RX of the flat screw 40 is shown by a dashed line. As described with reference to FIG. 1, the groove portions 45 are provided in the groove forming surface 42.

A central portion 47 of the groove forming surface 42 of the flat screw 40 is implemented as a recess to which one end of the groove portion 45 is coupled. The central portion 47 faces the through hole 56 of the barrel 50 shown in FIG. 1. The central portion 47 intersects the central axis RX.

The groove portion 45 of the flat screw 40 forms a so-called scroll groove. The groove portion 45 extends spirally from the central portion 47 toward an outer periphery of the flat screw 40 so as to draw an arc. The groove portion 45 may extend spirally. The groove forming surface 42 is provided with ridge portions 46 that form side wall portions of the groove portions 45 and extend along each of the groove portions 45.

The groove portion 45 extends to a material introduction port 44 formed in a side surface 43 of the flat screw 40. The material introduction port 44 is a portion that receives the material supplied via the supply path 22 of the material supply unit 20.

FIG. 2 shows an example of the flat screw 40 including three groove portions 45 and three ridge portions 46. The number of the groove portions 45 or the ridge portions 46 provided on the flat screw 40 is not limited to three. The flat screw 40 may be provided with only one groove portion 45, or may be provided with two or more groove portions 45. Any number of the ridge portions 46 may be provided in accordance with the number of the groove portions 45.

FIG. 2 illustrates an example of the flat screw 40 in which the material introduction ports 44 are formed at three places. The number of the material introduction ports 44 provided in the flat screw 40 is not limited to three. In the flat screw 40, the material introduction port 44 may be provided at only one place, or may be provided at two or more places.

Figure 3:
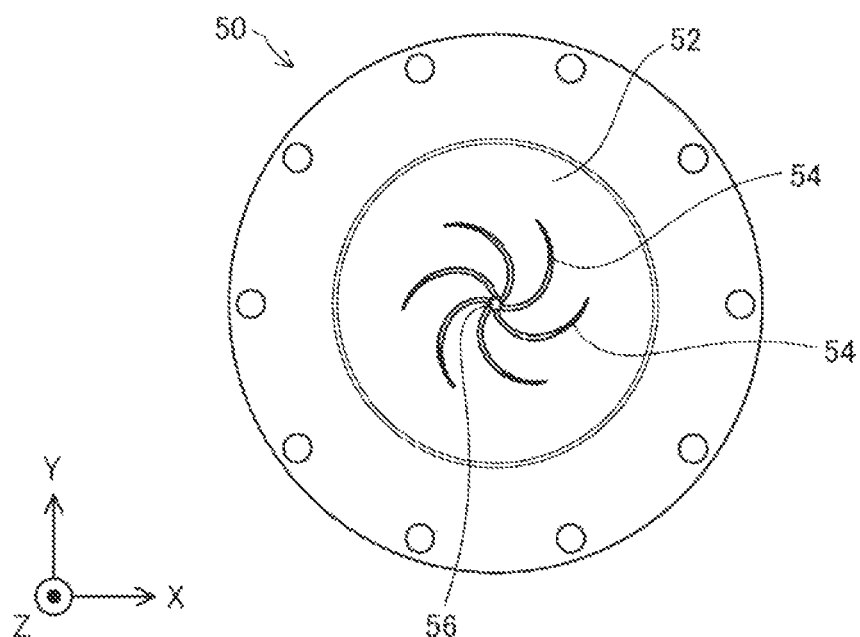
FIG. 3 is a top view showing a configuration of a barrel on a screw facing surface side.

FIG. 3 is a top view showing the configuration of the barrel 50 on the screw facing surface 52 side. As described above, the through hole 56 communicating with the nozzle 61 is formed at the center of the screw facing surface 52. A plurality of guide grooves 54 are formed around the through hole 56 in the screw facing surface 52. One end of the guide groove 54 is coupled to the through hole 56, and extends spirally from the through hole 56 toward an outer periphery of the screw facing surface 52. The guide groove 54 has a function of guiding the shaping material to the through hole 56.

Figure 4:
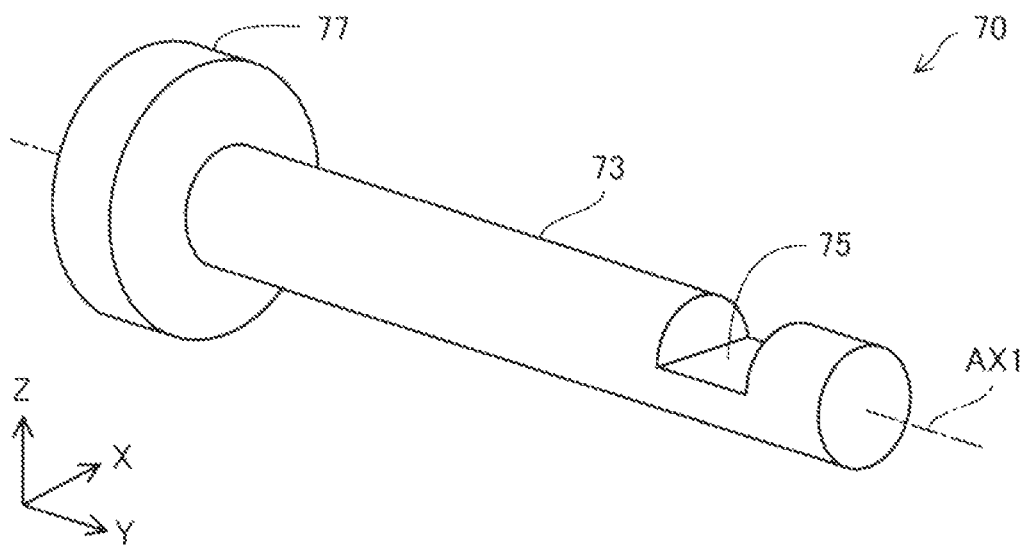
FIG. 4 is a perspective view showing a configuration of a valve portion of a discharge amount adjusting mechanism.
Figure 5:
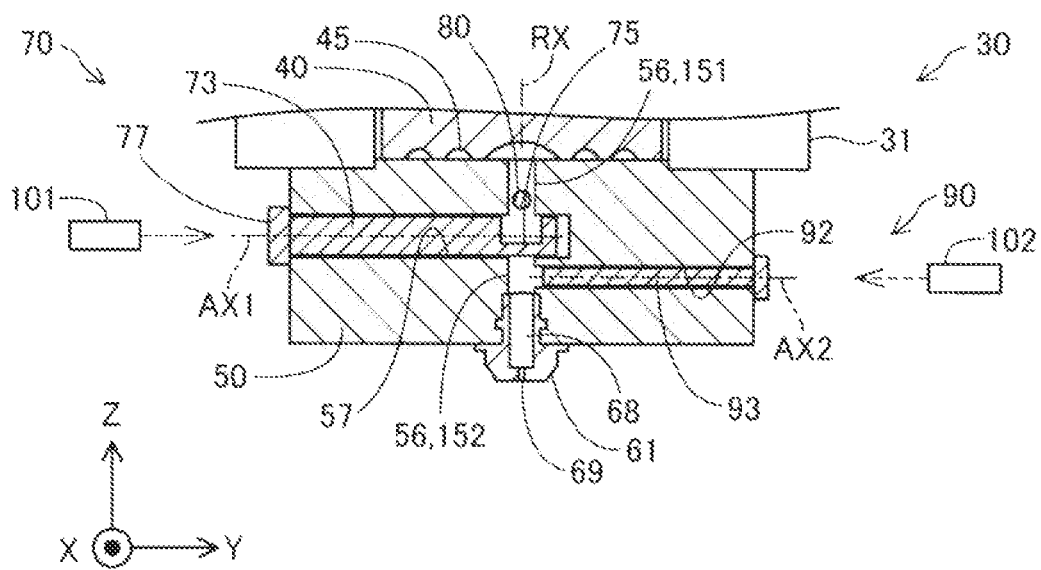
FIG. 5 is a diagram showing a configuration of the discharge amount adjusting mechanism and a suction portion.

FIG. 4 is a perspective view showing a configuration of the valve portion 73 of the discharge amount adjustment mechanism 70 according to the present embodiment. FIG. 5 is a diagram showing a configuration of the discharge amount adjusting mechanism 70 and the suction portion 90 according to the present embodiment. As described above, the discharge amount adjusting mechanism 70 has the valve portion 73 disposed in the cross hole 57. The valve portion 73 has a columnar shape centered on a central axis AX1. The valve portion 73 is provided with a recessed portion 75 by partially cutting out a part of a columnar outer periphery in a half-moon shape. The recessed portion 75 is disposed between the first flow path 151 and the second flow path 152. An operation portion 77 is provided at an end portion of the valve portion 73 on a −Y direction side. The valve drive unit 101 is coupled to the operation portion 77. The valve portion 73 rotates when a torque by the valve drive unit 101 is applied to the operation portion 77. The recessed portion 75 may be provided by forming a through hole intersecting the central axis AX1 of the valve portion 73 in the valve portion 73. The recessed portion 75 may also be referred to as a flow path.

Figure 6:
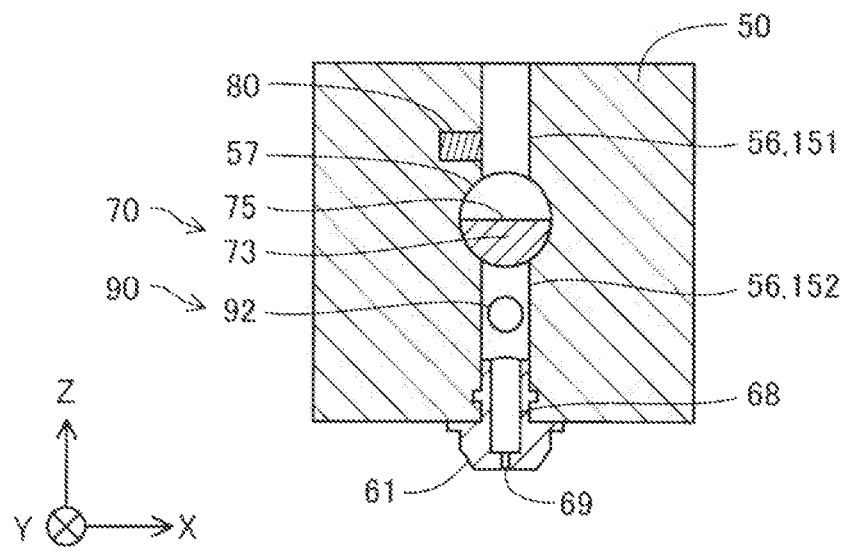
FIG. 6 is a first diagram showing an operation of the valve portion of the discharge amount adjusting mechanism.
Figure 7:
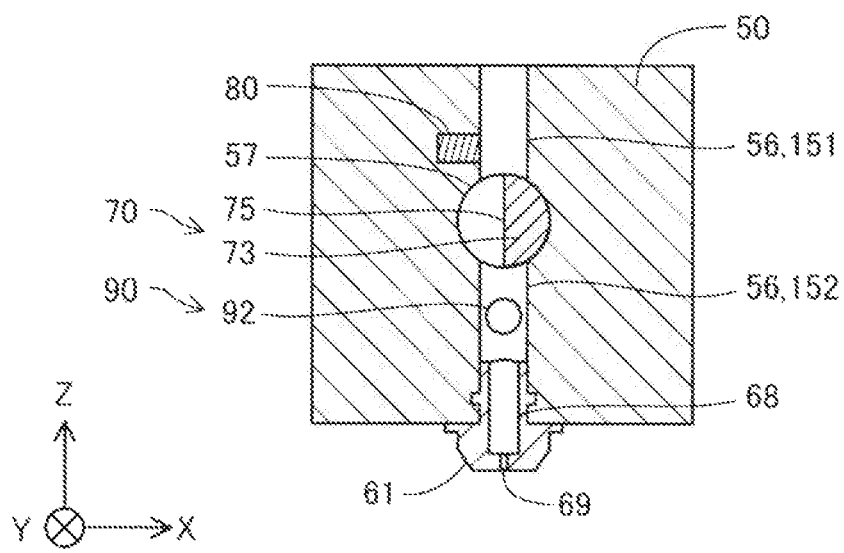
FIG. 7 is a second diagram showing an operation of the valve portion of the discharge amount adjusting mechanism.

FIG. 6 is a first diagram showing an operation of the valve portion 73 of the discharge amount adjusting mechanism 70. FIG. 7 is a second diagram showing an operation of the valve portion 73 of the discharge amount adjusting mechanism 70. As shown in FIG. 6, when the valve portion 73 rotates such that the recessed portion 75 is positioned upward, an opening portion of the second flow path 152 is closed by the valve portion 73, and a flow of the shaping material from the first flow path 151 into the second flow path 152 is blocked. On the other hand, as shown in FIG. 7, when the valve portion 73 rotates such that the recessed portion 75 faces the +X direction or the −X direction, the first flow path 151 communicates with the second flow path 152, and the shaping material flows from the first flow path 151 into the second flow path 152 at a maximum flow rate. By the valve portion 73 rotating about the central axis AX1 along the Y direction to change a position of the recessed portion 75, a flow path cross-sectional area between the first flow path 151 and the second flow path 152 is changed, and a flow rate of the shaping material flowing from the first flow path 151 into the second flow path 152 is adjusted. The discharge amount adjusting mechanism 70 may be implemented by, for example, a gate valve, a globe valve, or a ball valve, instead of one including the valve portion 73 described above.

Referring to FIG. 5, the suction portion 90 according to the present embodiment includes a cylindrical cylinder 92 provided in the barrel 50, a columnar plunger 93 accommodated in the cylinder 92, and a plunger drive unit 102 configured to move the plunger 93 within the cylinder 92. The cylinder 92 is coupled to the second flow path 152. The plunger drive unit 102 is implemented by a stepping motor driven under the control of the control unit 500, and a rack and pinion mechanism that converts a rotation of the stepping motor into a translational movement of the cylinder 92 along a central axis AX2 thereof. The plunger drive unit 102 may be implemented by the stepping motor driven under the control of the control unit 500, and a ball screw mechanism that converts the rotation of the stepping motor into the translational movement of the cylinder 92 along the central axis AX2 thereof, or may be implemented by an actuator such as a solenoid mechanism or a piezo element.

Figure 8:
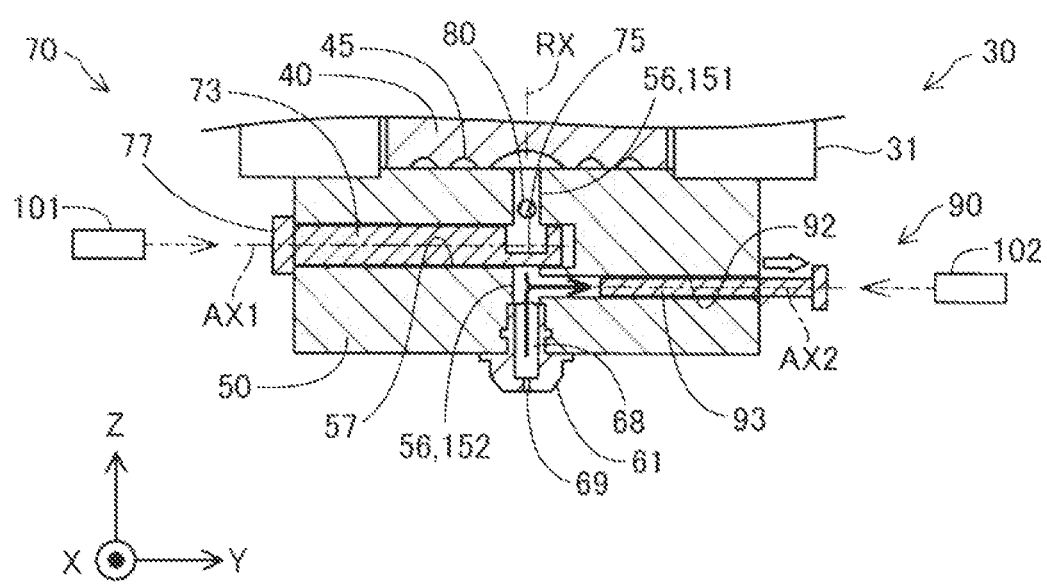
FIG. 8 is a diagram showing an operation of a plunger of the suction portion.

FIG. 8 is a diagram showing an operation of the plunger 93 of the suction portion 90. When the plunger 93 moves in a direction away from the second flow path 152, a negative pressure is generated in the cylinder 92, so that the shaping material in the second flow path 152 is drawn into the cylinder 92 as shown by an arrow in FIG. 8. As the shaping material in the second flow path 152 is drawn into the cylinder 92, the shaping material in the nozzle 61 is drawn into the second flow path 152. Therefore, when discharge of the shaping material from the nozzle hole 69 is stopped, the shaping material in the second flow path 152 is sucked into the cylinder 92, so that the shaping material discharged from the nozzle hole 69 can be cut off. On the other hand, when the plunger 93 moves in a direction approaching the second flow path 152, the shaping material in the cylinder 92 is pushed out into the second flow path 152 by the plunger 93. Therefore, when the discharge of the shaping material from the nozzle hole 69 is restarted, a response of the discharge of the shaping material from the nozzle hole 69 can be enhanced by pushing the shaping material in the cylinder 92 out into the second flow path 152. Moving the plunger 93 in a direction in which the shaping material is pushed out from the cylinder 92 may be referred to as pushing the plunger 93. Moving the plunger 93 in a direction in which the shaping material is drawn into the cylinder 92 may be referred to as pulling the plunger 93.

Figure 9:
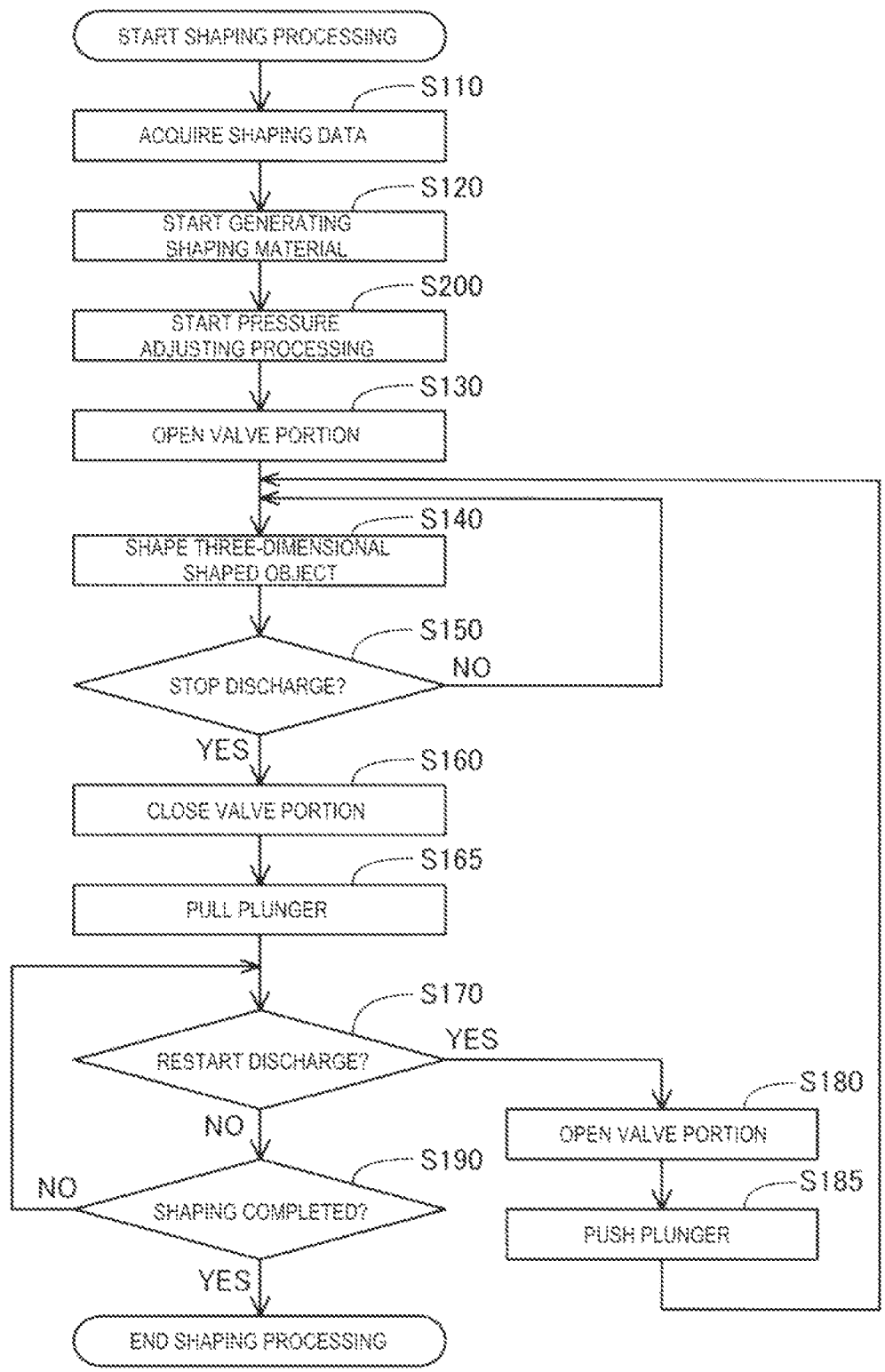
FIG. 9 is a flowchart showing contents of a shaping processing.

FIG. 9 is a flowchart showing contents of a shaping processing according to the present embodiment. When a predetermined start operation is performed by a user on an operation panel provided in the three-dimensional shaping device 100 or a computer coupled to the three-dimensional shaping device 100, the shaping processing is executed by the control unit 500.

First, in step S110, the control unit 500 acquires shaping data for shaping the three-dimensional shaped object. The shaping data represents information such as a movement path of the nozzle hole 69 with respect to the stage 300, an amount of the shaping material discharged from the nozzle hole 69, a target rotation speed of the drive motor 36 for rotating the flat screw 40, and a target temperature of the heater 58 provided in the barrel 50. The shaping data is generated by, for example, slicer software installed in the computer that is coupled to the three-dimensional shaping device 100. The slicer software reads shape data representing a shape of the three-dimensional shaped object created using three-dimensional CAD software or three-dimensional CG software, divides the shape of the three-dimensional shaped object into layers having a predetermined thickness, and generates the shaping data. Data in an STL format or an AMF format can be used for the shape data read into the slicer software. The shaping data created by the slicer software is shown with a G code, an M code, or the like. The control unit 500 acquires the shaping data from the computer coupled to the three-dimensional shaping device 100 or a recording medium such as a USB memory.

Next, in step S120, the control unit 500 starts generating a shaping material. The control unit 500 controls the rotation of the flat screw 40 and the temperature of the heater 58 provided in the barrel 50, so as to melt the material and generate the shaping material. By the rotation of the flat screw 40, the material supplied from the material supply unit 20 is introduced into the groove portion 45 from the material introduction port 44 of the flat screw 40. The material introduced into the groove portion 45 is transported along the groove portion 45 to the central portion 47. The material transported in the groove portion 45 is sheared by a relative rotation between the flat screw 40 and the barrel 50, and at least a part of the material is melted by heating with the heater 58 to become the paste-shaped shaping material having fluidity. The shaping material collected in the central portion 47 is supplied to the first flow path 151 by an internal pressure generated in the central portion 47. The shaping material continues to be generated while the processing is performed.

After the generation of the shaping material is started in step S120, in step S200, the control unit 500 starts executing a pressure adjusting processing for stabilizing the pressure of the shaping material in the first flow path 151. The pressure adjusting processing is executed in parallel with the shaping processing while the flat screw 40 is rotated to generate the shaping material. The specific contents of the pressure adjusting processing will be described later.

Thereafter, in step S130, the control unit 500 controls the valve drive unit 101 to rotate the valve portion 73, thereby causing communication between the first flow path 151 and the second flow path 152. With the communication between the first flow path 151 and the second flow path 152, the discharge of the shaping material from the nozzle hole 69 is started.

In step S140, the control unit 500 shapes the three-dimensional shaped object by discharging the shaping material from the nozzle hole 69 toward the stage 300 while controlling the moving mechanism 400 to change the relative position between the nozzle hole 69 and the stage 300 according to the shaping data.

In step S150, the control unit 500 determines whether to stop the discharge of the shaping material from the nozzle hole 69. The control unit 500 determines whether to stop the discharge of the shaping material from the nozzle hole 69 based on the shaping data. For example, when a target position of the nozzle hole 69 is set at a position far from a current position of the nozzle hole 69 discharging the shaping material, the control unit 500 determines to stop the discharge of the shaping material from the nozzle hole 69. When it is determined in step S150 that the discharge of the shaping material from the nozzle hole 69 is not stopped, the control unit 500 returns the processing to step S140 to continue the shaping of the three-dimensional shaped object.

When it is determined in step S150 to stop the discharge of the shaping material from the nozzle hole 69, in step S160, the control unit 500 controls the valve drive unit 101 to rotate the valve portion 73, so as to block the flow of the shaping material from the first flow path 151 into the second flow path 152. By blocking the flow of the shaping material from the first flow path 151 into the second flow path 152, the discharge of the shaping material from the nozzle hole 69 is stopped. When the discharge of the shaping material from the nozzle hole 69 is stopped, in step S165, the control unit 500 controls the plunger drive unit 102 to pull the plunger 93, so as to suck the shaping material in the second flow path 152 into the cylinder 92. Therefore, the discharge of the shaping material from the nozzle hole 69 is immediately stopped. The shaping of the three-dimensional shaped object is stopped while the discharge of the shaping material from the nozzle hole 69 is stopped.

In step S170, the control unit 500 determines whether to restart the discharge of the shaping material from the nozzle hole 69. When it is determined in step S170 to restart the discharge of the shaping material from the nozzle hole 69, in step S180, the control unit 500 controls the valve drive unit 101 to rotate the valve portion 73, thereby causing the communication between the first flow path 151 and the second flow path 152. When the discharge of the shaping material from the nozzle hole 69 is restarted, in step S185, the control unit 500 controls the plunger drive unit 102 to push the plunger 93, so as to push the shaping material in the cylinder 92 out into the second flow path 152. Therefore, the discharge of the shaping material from the nozzle hole 69 is immediately restarted. Thereafter, the control unit 500 returns the processing to step S140, and the shaping of the three-dimensional shaped object is restarted.

When it is determined in step S170 that the discharge of the shaping material from the nozzle hole 69 is not restarted, in step S190, the control unit 500 determines whether the shaping of the three-dimensional shaped object is completed. The control unit 500 can determine whether the shaping of the three-dimensional shaped object is completed based on the shaping data. When it is determined in step S190 that the shaping of the three-dimensional shaped object is not completed, the control unit 500 returns the processing to step S170 and determines again whether to restart the discharge of the shaping material from the nozzle hole 69. On the other hand, when it is determined in step S190 that the shaping of the three-dimensional shaped object is completed, the control unit 500 ends this processing.

Figure 10:
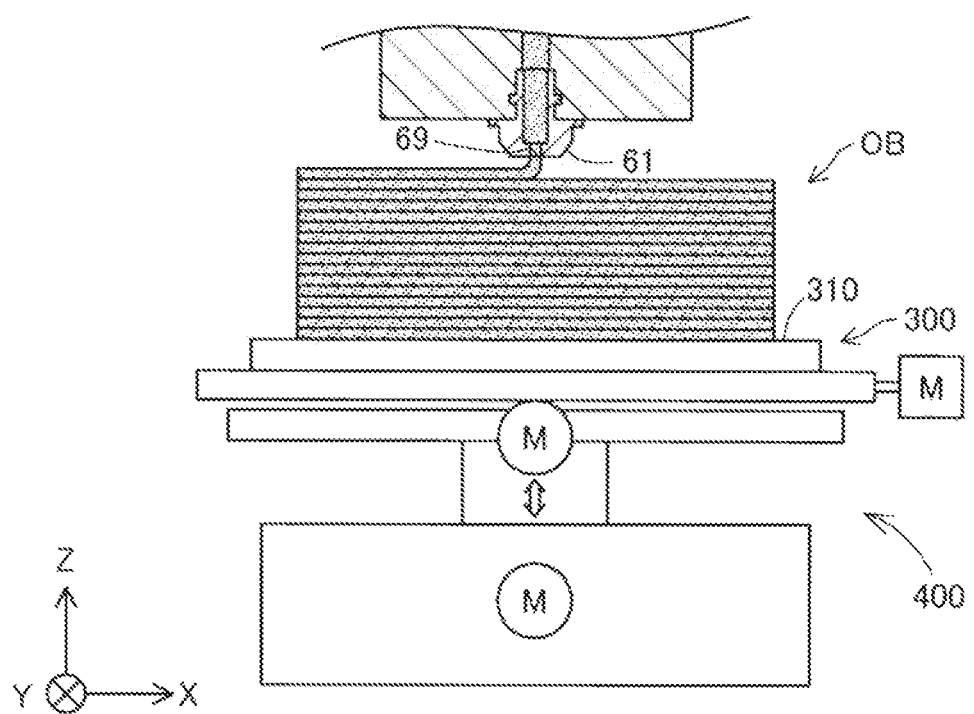
FIG. 10 is a diagram schematically showing a state where a three-dimensional shaped object is shaped.

FIG. 10 is a diagram schematically showing a state where a three-dimensional shaped object OB is shaped. The control unit 500 executes the shaping processing described above, so that the three-dimensional shaped object OB in which a plurality of layers of the shaping material are stacked is shaped on the stage 300.

Figure 11:
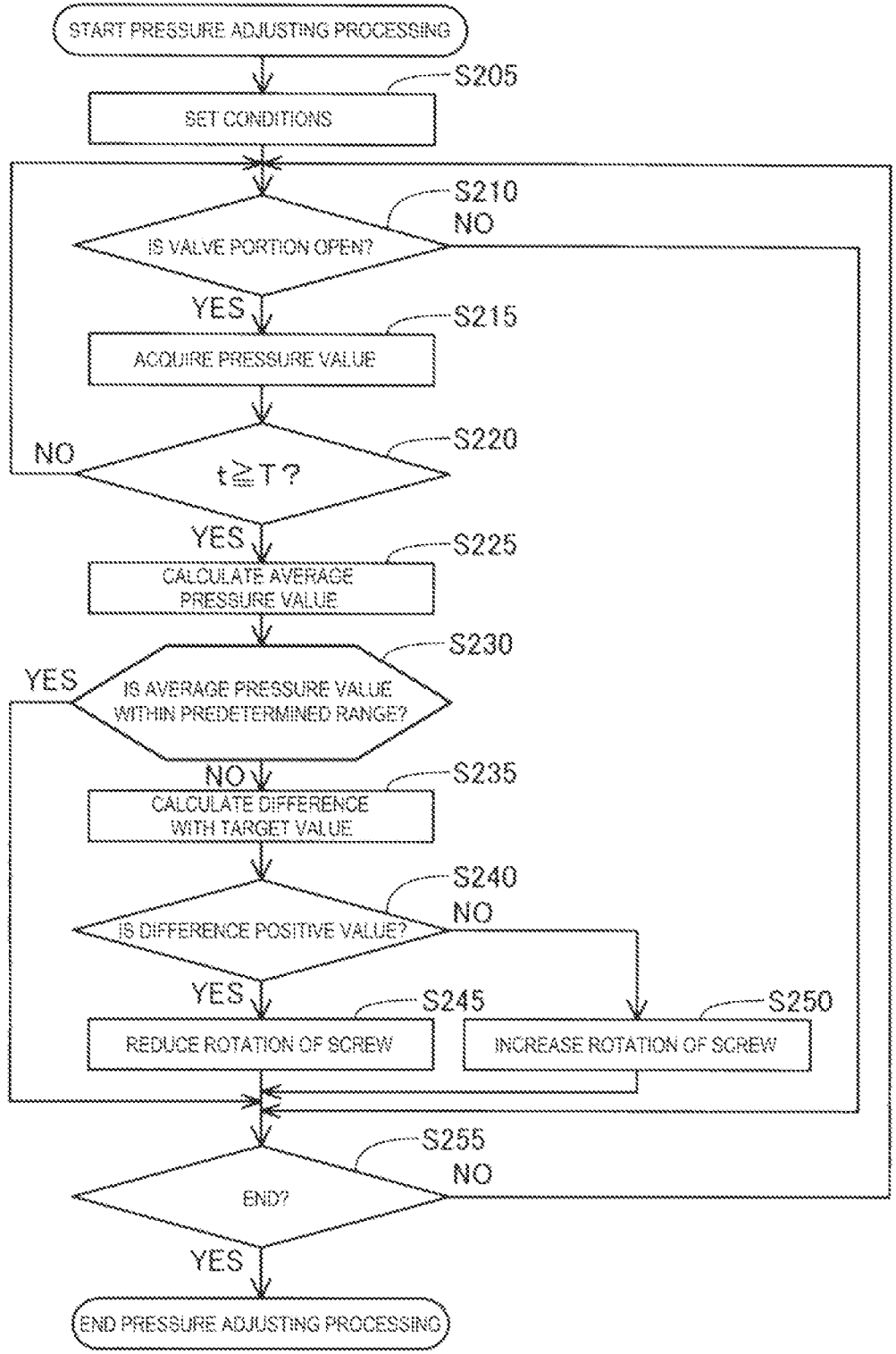
FIG. 11 is a flowchart showing contents of a pressure adjusting processing according to the first embodiment.

FIG. 11 is a flowchart showing contents of the pressure adjusting processing. This processing is executed by the control unit 500 after the generation of the shaping material is started in the shaping processing described with reference to FIG. 9.

First, in step S205, the control unit 500 sets a type of material used for shaping the three-dimensional shaped object OB, a collection time T, a target pressure value Pb, and a pressure tolerance $\Delta P$. The collection time T means a time for collecting a pressure value of the shaping material in the first flow path 151 by the pressure measuring portion 80. The target pressure value Pb means a target value of pressure of the shaping material in the first flow path 151. The pressure tolerance $\Delta P$ means an allowable range of deviation of the pressure of the shaping material in the first flow path 151 from the target pressure value Pb. According to the present embodiment, by specifying the type of material, the collection time T, the target pressure value Pb, and the pressure tolerance $\Delta P$ in advance by the user using a computer coupled to the three-dimensional shaping device 100, the type of material, the collection time T, the target pressure value Pb, and the pressure tolerance $\Delta P$ are represented in the shaping data. The control unit 500 acquires the type of material, the collection time T, the target pressure value Pb, and the pressure tolerance $\Delta P$ by acquiring the shaping data from the computer coupled to the three-dimensional shaping device 100.

Next, in step S210, the control unit 500 determines whether the valve portion 73 is open. For example, the control unit 500 can use the shaping data to determine whether the valve portion 73 is open. When it is determined in step S210 that the valve portion 73 is not open, the control unit 500 proceeds the processing to step S255 to determine whether to end the pressure adjusting processing. According to the present embodiment, when there is a command to stop the rotation of the flat screw 40, the control unit 500 determines to end the pressure adjusting processing. When it is determined to end the pressure adjusting processing, the control unit 500 ends this processing. On the other hand, when it is determined not to end the pressure adjusting processing, the control unit 500 returns the processing to step S210 and determines again whether to open the valve portion 73.

When it is determined in step S210 that the valve portion 73 is open, in step S215, the control unit 500 uses the pressure measuring portion 80 to acquire the pressure value P, which is the pressure value of the shaping material in the first flow path 151. The acquired pressure value P is stored in a storage device of the control unit 500. Thereafter, in step S220, the control unit 500 determines whether a time t from a start of acquisition of the pressure value P is equal to or more than the collection time T. When it is determined in step S220 that the time t is less than the collection time T, the control unit 500 repeats the processing from step S210 to step S220 until it is determined in step S220 that the time t is equal to or more than the collection time T, and acquires a plurality of samples of pressure values P at a preset time interval. This time interval is set, for example, to one second. The collection time T is set to, for example, ten seconds. In this case, the control unit 500 acquires a sample of the pressure value P once every one second during ten seconds. That is, the control unit 500 acquires ten samples of the pressure values P within the collection time T. Thereafter, in step S210, the control unit 500 may determine whether a predetermined number of samples of the pressure values P are acquired, instead of determining whether the time t is equal to or more than the collection time T.

On the other hand, when it is determined in step S220 that the time t is equal to or more than the collection time T, in step S225, the control unit 500 calculates an average value of the plurality of pressure values P acquired within the collection time T. According to the present embodiment, the control unit 500 uses a total pressure value $\Sigma P_n$ that is a total value from a first acquired pressure value $P_1$ to an n-th acquired pressure value $P_n$ and a number N of samples of the pressure values P acquired within the collection time T to calculate an average pressure value Pave expressed by the following Formula (1).

$$Pave = \Sigma P_n / N \qquad (1)$$

According to the present embodiment, in step S225, the control unit 500 calculates the average pressure value Pave by calculating a moving average of the plurality of acquired pressure values P. For example, when the values from the first pressure value $P_1$ to the n-th pressure value $P_n$ are acquired, the control unit 500 calculates the average pressure value Pave by dividing the total value $(P_1+P_2+P_3+\ldots+P_n)$ from $P_1$ to $P_n$ by the number of samples N from $P_1$ to $P_n$. Thereafter, when an (n+1)-th pressure value $P_{n+1}$ is acquired, the control unit 500 calculates an average pressure value Pave by dividing a total value $(P_2+P_3+P_4+\ldots+P_n+P_{n+1})$ from a second pressure value $P_2$ to the (n+1)-th pressure value $P_{n+1}$ by the number of samples N.

Next, in step S230, the control unit 500 determines whether the average pressure value Pave is within a predetermined allowable range. When the average pressure value Pave is equal to or less than a first threshold value obtained by adding the pressure tolerance ΔP to the target pressure value Pb, and the average pressure value Pave is equal to or more than a second threshold value obtained by subtracting the pressure tolerance ΔP from the target pressure value Pb, the control unit 500 determines that the average pressure value Pave is within the allowable range. When it is determined in step S230 that the average pressure value Pave is within the allowable range, the control unit 500 proceeds the processing to step S255 to determine whether to end the pressure adjusting processing. On the other hand, when it is determined in step S230 that the average pressure value Pave is not within the allowable range, in step S235, the control unit 500 uses the average pressure value Pave and the target pressure value Pb to calculate a pressure difference Pd expressed by the following Formula (2).

$$Pd = Pave - Pb \qquad (2)$$

In step S240, the control unit 500 determines whether the pressure difference Pd is a positive value. When it is determined in step S240 that the pressure difference Pd is a positive value, in other words, when it is determined that the average pressure value Pave is greater than the target pressure value Pb, in step S245, the control unit 500 decreases the rotation speed of the flat screw 40 so that the pressure difference Pd approaches 0. The rotation speed of the flat screw 40 is referred to as a screw rotation speed. The rotation speed means the number of times an object rotates per unit time. According to the present embodiment, in step S240, the control unit 500 refers to a table in which a relationship between the screw rotation speed and the pressure is expressed, so as to calculate a correction value of the screw rotation speed, and calculate a new screw rotation speed obtained by subtracting the correction value from a current screw rotation speed. The table in which the relationship between the screw rotation speed and the pressure is expressed can be set by a test performed in advance. The control unit 500 controls the drive motor 36 to obtain a new screw rotation speed, thereby decreasing the screw rotation speed. Instead of referring to the table, the control unit 500 may use a preset function to calculate a new screw rotation speed.

On the other hand, when it is determined in step S240 that the pressure difference Pd is not a positive value, in other words, when it is determined that the average pressure value Pave is smaller than the target pressure value Pb, in step S250, the control unit 500 increases the rotation speed of the flat screw 40 so that the pressure difference Pd approaches 0. According to the present embodiment, in step S245, the control unit 500 refers to the table in which the relationship between the screw rotation speed and the pressure is expressed, so as to calculate a correction value of the screw rotation speed, and calculate a new screw rotation speed obtained by adding the correction value to the current screw rotation speed. The control unit 500 controls the drive motor 36 to obtain a new screw rotation speed, thereby increasing the screw rotation speed. The control performed by the control unit 500 during a period when the discharge of the shaping material from the nozzle hole 69 is not stopped by the discharge amount adjusting mechanism 70 may be referred to as a first control, and the control performed by the control unit 500 during a period when the discharge of the shaping material from the nozzle hole 69 is stopped by the discharge amount adjusting mechanism 70 may be referred to as a second control. A degree of adjustment of the rotation of the flat screw 40 under the second control is smaller than a degree of adjustment of the rotation of the flat screw 40 under the first control. The degree of adjustment of the rotation of the flat screw 40 means a magnitude of a change in the rotation speed of the flat screw 40 by adjustment. A small degree of adjustment of the rotation of the flat screw 40 means not only that the change in the rotation speed of the flat screw 40 by the adjustment is small, but also that the rotation of the flat screw 40 is not adjusted.

Thereafter, in step S255, the control unit 500 determines whether to stop the pressure adjusting processing. According to the present embodiment, when there is a command to stop the rotation of the flat screw 40, the control unit 500 determines to end the pressure adjusting processing. When it is determined to end the pressure adjusting processing in step S255, the control unit 500 ends this processing. On the other hand, when it is determined not to end the pressure adjusting processing in step S255, the control unit 500 returns the processing to step S210, and repeats the processing from step S210. At this time, as described above, the control unit 500 calculates the average pressure value Pave by calculating the moving average of the plurality of acquired pressure values P. Therefore, for example, in step S215, when the (n+1)-th pressure value $P_{n+1}$ is acquired, in step S225, the average pressure value Pave is calculated by dividing the total value $(P_2+P_3+P_4+\ldots+P_n+P_{n+1})$ from the second pressure value $P_2$ to the (n+1)-th pressure value $P_{n+1}$ by the number of samples N.

Figure 12:
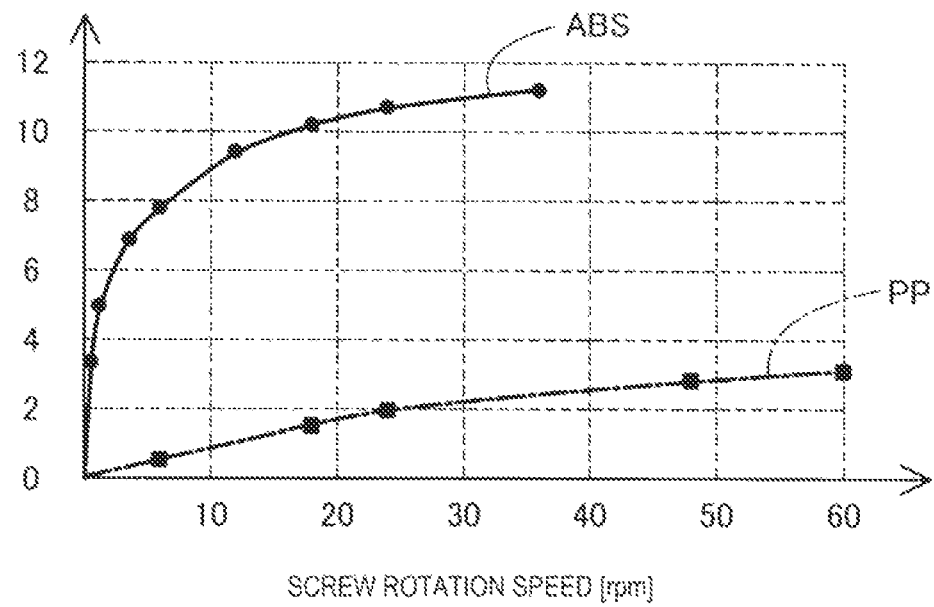
FIG. 12 is a graph showing an example of a relationship between a screw rotation speed and a pressure value.

FIG. 12 is a graph showing an example of a relationship between the screw rotation speed and the pressure value P. A horizontal axis shows the screw rotation speed. A vertical axis shows the pressure value P. The relationship between the screw rotation speed and the pressure value P when ABS resin is used as the material is shown by a solid line, and the relationship between the screw rotation speed and the pressure value P when polypropylene resin (PP) is used as the material is shown by a dashed line. In FIG. 12, as an example, the relationship between the screw rotation speed and the pressure value P is expressed when the temperature of the heater 58 is 210°, the opening shape of the nozzle hole 69 is circle, and the nozzle diameter Dn is 1.0 mm.

Figure 13:
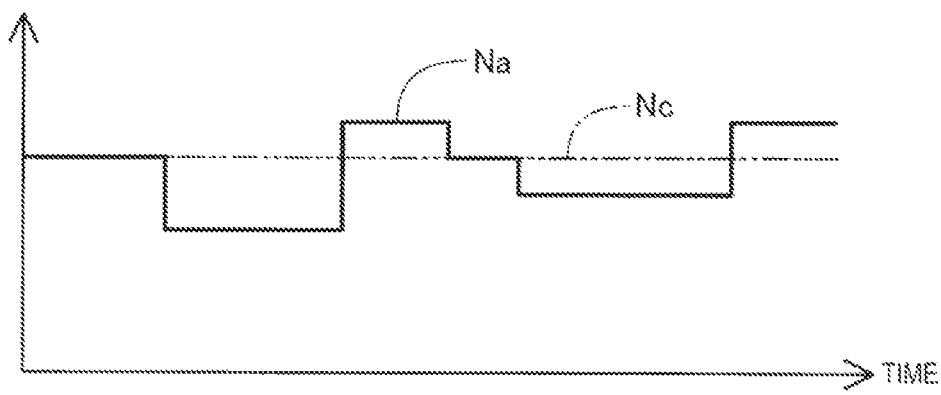
FIG. 13 is a graph showing an example of a relationship between the screw rotation speed and time.

FIG. 13 is a graph showing an example of a relationship between the screw rotation speed and time. The horizontal axis shows time. The vertical axis shows the screw rotation speed. When the rotation of the flat screw is adjusted by the pressure adjusting processing described above, the control unit 500 adjusts a screw rotation speed Na, as shown by a solid line in FIG. 13, by controlling the drive motor 36 so that a difference between the measured pressure value P and the target pressure value Pb approaches 0. On the other hand, when the rotation of the flat screw 40 is not adjusted, the control unit 500 controls the drive motor 36 such that the screw rotation speed is kept at a preset constant rotation speed Nc as shown by a two-dot chain line in FIG. 13.

Figure 14:
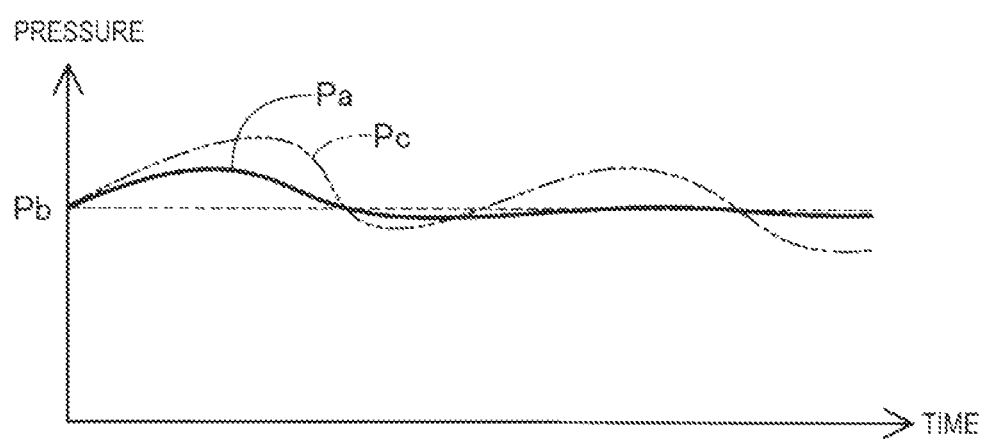
FIG. 14 is a graph showing an example of a relationship between the pressure value and time.

FIG. 14 is a graph showing an example of a relationship between the pressure value and time. The horizontal axis shows time. The vertical axis shows the pressure of the shaping material in the first flow path 151. When the rotation speed of the flat screw 40 is adjusted by the pressure adjusting processing described above, as shown by a solid line in FIG. 14, variations in pressure due to disturbance such as an increase or decrease in the temperature around the three-dimensional shaping device 100 and vibrations applied to the three-dimensional shaping device 100 is prevented, and a measured pressure value Pa approaches the target pressure value Pb. On the other hand, when the rotation speed of the flat screw 40 is kept constant without being adjusted, as shown by a two-dot chain line in FIG. 14, due to the disturbance such as the increase or decrease in the temperature around the three-dimensional shaping device 100 and vibrations applied to the three-dimensional shaping device 100, a measured pressure value Pc varies. For example, regardless of whether the discharge of the shaping material from the nozzle hole 69 is stopped by the discharge amount adjusting mechanism 70, when the rotation speed of the flat screw 40 is always kept constant, during the period when the discharge of the shaping material from the nozzle hole 69 is not stopped by the discharge amount adjusting mechanism 70, the pressure of the shaping material in the first flow path 151 varies, so that the discharge of the shaping material from the nozzle hole 69 becomes unstable. During the period when the discharge of the shaping material from the nozzle hole 69 is stopped by the discharge amount adjusting mechanism 70, the pressure of the shaping material in the first flow path 151 increases with time. On the other hand, regardless of whether the discharge of the shaping material from the nozzle hole 69 is stopped by the discharge amount adjusting mechanism 70, when the rotation speed of the flat screw 40 is adjusted according to the pressure of the shaping material in the first flow path 151, during the period when the discharge of the shaping material from the nozzle hole 69 is not stopped by the discharge amount adjusting mechanism 70, the variation in the pressure of the shaping material in the first flow path 151 is prevented, so that the discharge of the shaping material from the nozzle hole 69 is prevented from becoming unstable. During the period when the discharge of the shaping material from the nozzle hole 69 is stopped by the discharge amount adjusting mechanism 70, in order to prevent an increase in the pressure of the shaping material in the first flow path 151, the rotation speed of the flat screw 40 is reduced with time. Therefore, when the discharge of the shaping material from the nozzle hole 69 is restarted, the rotation speed of the flat screw is insufficient, and the discharge of the shaping material from the nozzle hole 69 becomes unstable.

According to the three-dimensional shaping device 100 of the present embodiment described above, during the period when the discharge of the shaping material from the nozzle hole 69 is not stopped by the discharge amount adjusting mechanism 70, the control unit 500 controls the drive motor 36 such that the degree of adjustment of the rotation speed of the flat screw 40 is increased, and during the period when the discharge of the shaping material from the nozzle hole 69 is stopped by the discharge amount adjusting mechanism 70, the control unit 500 controls the drive motor 36 such that the degree of adjustment of the rotation speed of the flat screw 40 is reduced. Therefore, during the period when the discharge of the shaping material from the nozzle hole 69 is stopped, it is difficult to adjust the rotation speed of the flat screw 40 even when the pressure of the shaping material in the first flow path 151 varies, so that when the discharge of the shaping material from the nozzle hole 69 is restarted, the insufficient rotation speed of the flat screw 40 and unstable discharge of the shaping material from the nozzle hole 69 can be prevented. In particular, according to the present embodiment, during the period when the discharge of the shaping material from the nozzle hole 69 is not stopped by the discharge amount adjusting mechanism 70, the control unit 500 controls the drive motor 36 such that the rotation speed of the flat screw 40 is adjusted according to the pressure of the shaping material in the first flow path 151, and during the period when the discharge of the shaping material from the nozzle hole 69 is stopped by the discharge amount adjusting mechanism 70, the control unit 500 controls the drive motor 36 such that the rotation speed of the flat screw 40 is kept constant without being adjusted. Therefore, during the period when the discharge of the shaping material from the nozzle hole 69 is not stopped by the discharge amount adjusting mechanism 70, since the variation in the pressure of the shaping material in the first flow path 151 is prevented, the unstable discharge of the shaping material from the nozzle hole 69 can be prevented. During the period when the discharge of the shaping material from the nozzle hole 69 is stopped by the discharge amount adjusting mechanism 70, even when the pressure of the shaping material in the first flow path 151 increases, the rotation speed of the flat screw 40 is kept constant. Therefore, the rotation speed of the flat screw 40 can be prevented from being reduced due to the discharge of the shaping material from the nozzle hole 69 being stopped by the discharge amount adjusting mechanism 70, so that when the discharge of the shaping material from the nozzle hole 69 is restarted, the unstable discharge of the shaping material from the nozzle hole 69 can be prevented.

According to the present embodiment, when it is determined that the average pressure value Pave is not within the allowable range, the control unit 500 adjusts the rotation speed of the flat screw 40, and when it is determined that the average pressure value Pave is within the allowable range, the control unit 500 does not adjust the rotation speed of the flat screw 40. Therefore, the change in the rotation speed of the flat screw 40 is repeated due to a slight variation in pressure, so that it is possible to prevent the difficulty in stabilizing the discharge of the shaping material from the nozzle hole 69.

According to the present embodiment, the control unit 500 uses the moving average of the plurality of pressure values P measured by the pressure measuring portion 80 to calculate the rotation speed of the flat screw 40. Therefore, it is possible to prevent a case where it is difficult to stabilize the discharge of the shaping material from the nozzle hole 69 due to a sudden variation in the pressure value P generated during the pressure adjusting processing.

According to the present embodiment, the control unit 500 adjusts the rotation speed of the flat screw 40 with reference to the table in which the relationship between the rotation speed of the flat screw 40 and the pressure of the shaping material is expressed. Therefore, even when the relationship between the rotation speed of the flat screw 40 and the pressure of the shaping material is non-linear, the discharge of the shaping material from the nozzle hole 69 can be stabilized.

According to the present embodiment, the three-dimensional shaping device 100 includes the flat screw 40 having a short length along the Z direction, and the material can be plasticized to obtain the shaping material using the rotation of the flat screw 40. Therefore, it is possible to reduce a size of the three-dimensional shaping device 100 in the Z direction.

According to the present embodiment, the discharge amount adjusting mechanism 70 includes the valve portion 73 that rotates in the cross hole 57, and the stop and restart of the discharge of the shaping material from the nozzle hole 69 can be switched by the rotation of the valve portion 73. Therefore, the stop and restart of the discharge of the shaping material from the nozzle hole 69 can be switched with a simple configuration.

According to the present embodiment, a pellet-shaped ABS resin is used as the material, whereas as a material used in the shaping unit 200, for example, a material for shaping a three-dimensional shaped object using various materials such as a material having thermoplasticity, a metal material, and a ceramic material as a main material can also be used. Here, the "main material" means a central material for forming a shape of the three-dimensional shaped object, and a material occupying a content of 50% by weight or more in the three-dimensional shaped object. The above shaping materials include those in which main materials are melted alone, and those in which some of the contained components are melted together with the main materials to form a paste.

When a material having thermoplasticity is used as the main material, a shaping material is generated by plasticizing with the material in the plasticization unit 30. The "plasticization" means that a material having thermoplasticity is heated and melted. The "melting" also means that a material having thermoplasticity is softened by being heated to a temperature equal to or higher than a glass transition point, and exhibits fluidity.

As a material having thermoplasticity, for example, a thermoplastic resin material obtained by combining one or more of the following can be used.

Example of Thermoplastic Resin Material

General-purpose engineering plastics such as a polypropylene resin (PP), a polyethylene resin (PE), a polyacetal resin (POM), a polyvinyl chloride resin (PVC), a polyamide resin (PA), an acrylonitrile-butadiene-styrene resin (ABS), a polylactic acid resin (PLA), a polyphenylene sulfide resin (PPS), polycarbonate (PC), modified polyphenylene ether, polybutylene terephthalate, and polyethylene terephthalate, and engineering plastics such as polysulfone, polyethersulfone, polyphenylene sulfide, polyarylate, polyimide, polyamideimide, polyetherimide, and polyetheretherketone (PEEK)

The material having thermoplasticity may contain pigments, metals, ceramics, and an additive such as a wax, a flame retardant, an antioxidant, and a heat stabilizer. The material having thermoplasticity is plasticized and melted by the rotation of the flat screw 40 and the heating with the heater 58 in the plasticization unit 30. After the shaping material thus generated is discharged from the nozzle hole 69, the shaping material is cured due to a reduction in temperature.

It is desirable that the material having thermoplasticity is discharged from the nozzle holes 69 in a state where the material is heated to a temperature equal to or higher than the glass transition point thereof and is in a state of being completely melted. The "state of being completely melted" means a state where a non-melted material having thermoplasticity does not exist, and means a state where, for example, when a pellet-shaped thermoplastic resin is used as the material, a pellet-shaped solid does not remain.

In the shaping unit 200, for example, the following metal material may be used as a main material instead of the above material having thermoplasticity. In this case, it is desirable that a component to be melted at the time of generating the shaping material is mixed with a powder material obtained by converting the following metal material into a powder, and then the mixture is charged into the plasticization unit 30.

Example of Metal Material

A single metal of magnesium (Mg), iron (Fe), cobalt (Co) or chromium (Cr), aluminum (Al), titanium (Ti), copper (Cu), and nickel (Ni), or an alloy containing one or more of these metals Example of Alloy Maraging steel, steel, stainless steel, cobalt chrome molybdenum, titanium alloy, nickel alloy, aluminum alloy, cobalt alloy, and cobalt chromium alloy In the shaping unit 200, a ceramic material can be used as a main material instead of the above metal material. As the ceramic material, for example, oxide ceramics such as silicon dioxide, titanium dioxide, aluminum oxide, and zirconium oxide, and non-oxide ceramics such as aluminum nitride can be used. When the above metal material or ceramic material is used as the main material, the shaping material disposed on the stage 300 may be cured by, for example, sintering with laser irradiation or warm air.

The powder material of the metal material or the ceramic material charged into the material supply unit 20 may be a mixed material obtained by mixing a plurality of types of powders of single metal powder, alloy powder, and ceramic material powder. The powder material of the metal material or the ceramic material may be coated with, for example, the thermoplastic resin shown above or another thermoplastic resin. In this case, the thermoplastic resin may be melted in the plasticization unit 30 to exhibit fluidity.

For example, the following solvents can be added to the powder material of the metal material or the ceramic material charged into the material supply unit 20. The solvent can be used alone or in combination of two or more selected from the following.

Example of Solvent

Water, (poly)alkylene glycol monoalkyl ethers such as ethylene glycol monomethyl ether, ethylene glycol monoethyl ether, propylene glycol monomethyl ether, and propylene glycol monoethyl ether, acetate esters such as ethyl acetate, n-propyl acetate, iso-propyl acetate, n-butyl acetate, and iso-butyl acetate, aromatic hydrocarbons such as benzene, toluene, and xylene, ketones such as methyl ethyl ketone, acetone, methyl isobutyl ketone, ethyl-n-butyl ketone, diisopropyl ketone, and acetylacetone, alcohols such as ethanol, propanol, and butanol, tetraalkylammonium acetates, sulfoxide-based solvents such as dimethyl sulfoxide and diethyl sulfoxide, pyridine-based solvents such as pyridine, γ-picoline, and 2,6-lutidine, tetraalkylammonium acetates (such as tetrabutylammonium acetate), and ionic liquids such as butyl carbitol acetate In addition, for example, the following binders can be added to the powder material of the metal material or the ceramic material charged into the material supply unit 20. Example of Binder Acrylic resin, epoxy resin, silicone resin, cellulose resin or other synthetic resins, or polylactic acid (PLA), polyamide (PA), polyphenylene sulfide (PPS), polyetheretherketone (PEEK) or other thermoplastic resins

B. Second Embodiment

Figure 15:
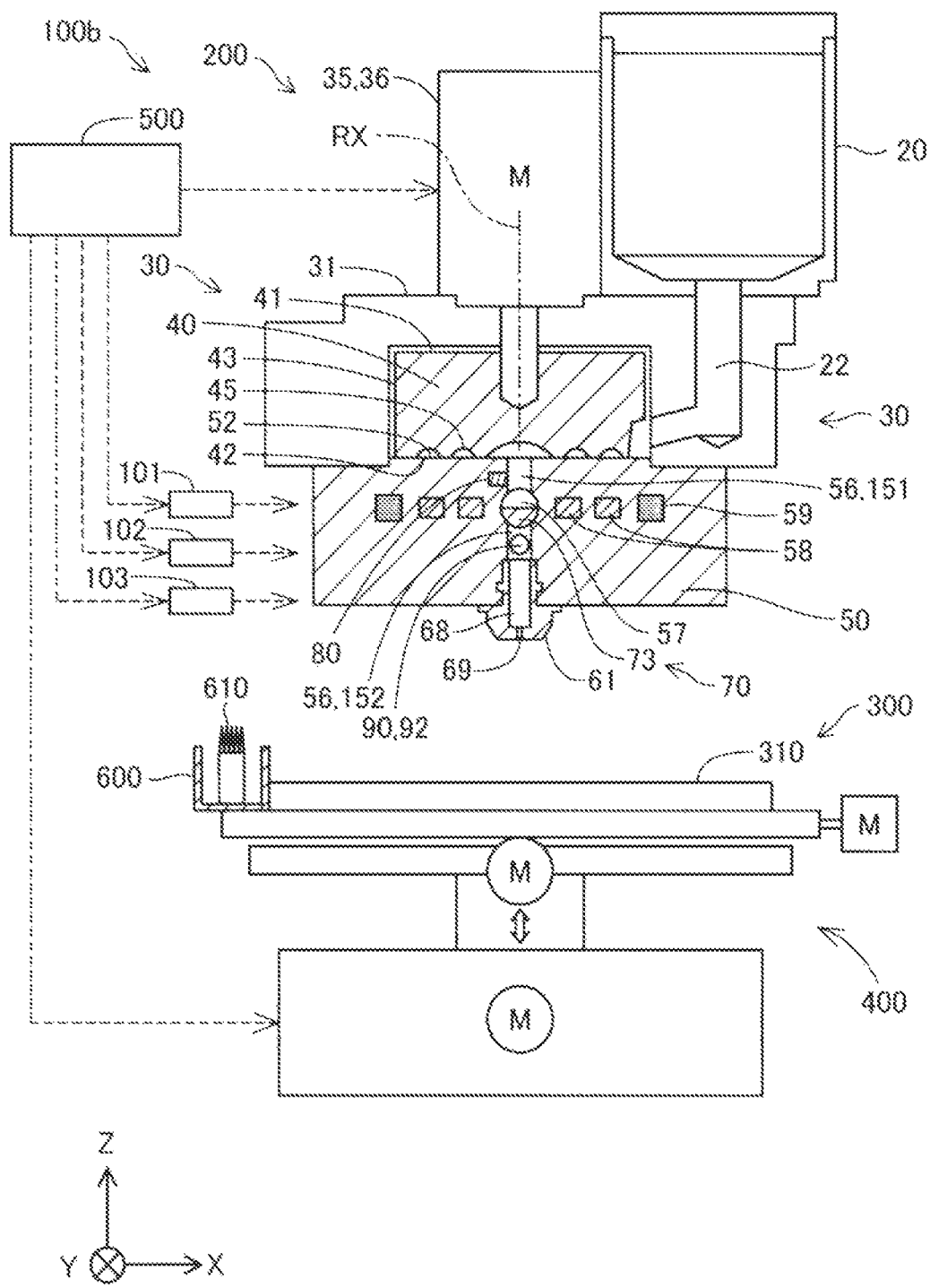
FIG. 15 is a diagram showing a schematic configuration of a three-dimensional shaping device according to a second embodiment.

FIG. 15 is a diagram showing a schematic configuration of a three-dimensional shaping device 100b according to a second embodiment. The three-dimensional shaping device 100b according to the second embodiment is different from the first embodiment in that a waste material collection box 600 and a cleaning member 610 are provided. Other configurations are the same as those of the first embodiment shown in FIG. 1 unless otherwise specified.

The waste material collection box 600 is provided adjacent to the stage 300. The waste material collection box 600 has an opening portion on an upper surface thereof. The waste material collection box 600 accommodates the shaping material discharged from the nozzle holes 69. The waste material collection box 600 is supported by the moving mechanism 400 and moves together with the stage 300 with respect to the nozzle 61.

The cleaning member 610 is fixed inside the waste material collection box 600. A tip end portion of the cleaning member 610 is positioned above the upper surface of the waste material collection box 600. In the present embodiment, the cleaning member 610 is a brush disposed such that a bristle tip faces upward. The cleaning member 610 moves together with the waste material collection box 600 with respect to the nozzle 61 by the moving mechanism 400. The cleaning member 610 may be a sheet made of resin or synthetic leather.

In the present embodiment, the control unit 500 executes a maintenance operation before the shaping of the three-dimensional shaped object is started or while the shaping of the three-dimensional shaped object is temporarily stopped. The maintenance operation includes an operation of discharging an old shaping material retained in the nozzle 61, and an operation of cleaning the shaping material adhering to a tip end of the nozzle 61. For example, when the shaping material retains in the first flow path 151, the second flow path 152, or the nozzle 61 for a long time, the retained shaping material may be denatured by influence of heat or the like. Therefore, the control unit 500 pauses the shaping of the three-dimensional shaped object at a predetermined timing, and executes the maintenance operation. For example, when it is determined in step S170 of FIG. 9 that the discharge of the shaping material from the nozzle hole 69 is restarted, the control unit 500 executes the maintenance operation. In the present embodiment, first, the control unit 500 controls the drive motor 36 such that a new shaping material is supplied to the first flow path 151, and the old shaping material retained in the first flow path 151, the second flow path 152, or the nozzle 61 is pushed out by a new shaping material, and therefore, the old shaping material is discharged from the nozzle hole 69 toward the waste material collection box 600. Next, the control unit 500 controls the moving mechanism 400 to bring the cleaning member 610 into contact with a tip end portion of the nozzle 61 to clean the shaping material and the like adhering to the tip end portion of the nozzle 61. Thereafter, the shaping of the three-dimensional shaped object is restarted by the control unit 500.

According to the present embodiment, the control unit 500 executes the pressure adjusting processing to adjust the rotation speed of the flat screw 40 in advance after the above maintenance operation and before restarting the shaping of the three-dimensional shaped object. The control unit 500 shapes the three-dimensional shaped object while generating the shaping material at the rotation speed of the flat screw 40 adjusted in advance during a period from when the shaping of the three-dimensional shaped object is restarted to when the shaping is paused. That is, the control unit 500 does not adjust the rotation speed of the flat screw 40 during the period from when the shaping of the three-dimensional shaped object is restarted to when the shaping is paused. According to the present embodiment, the control unit 500 starts discharging the shaping material from the nozzle hole 69 by the discharge amount adjusting mechanism 70, and adjusts the rotation speed of the flat screw 40 in advance by performing the pressure adjusting processing while discharging the shaping material from the nozzle hole 69 to an outer peripheral portion of the shaping surface 310 of the stage 300. Therefore, the rotation speed of the flat screw 40 can be adjusted in a state where a temperature in a vicinity of the nozzle 61 or the like is close to a temperature when the three-dimensional shaped object is shaped or the like. The control performed by the control unit 500 during the period after the maintenance operation and before restarting the shaping of the three-dimensional shaped object among the period when the discharge of the shaping material from the nozzle hole 69 is not stopped by the discharge amount adjusting mechanism 70 may be referred to as a third control. According to the present embodiment, under the third control, the rotation speed of the flat screw 40 is adjusted, and under the first control, the rotation speed of the flat screw 40 is not adjusted. Therefore, the degree of adjustment of the rotation of the flat screw 40 under the first control is smaller than the degree of adjustment of the rotation of the flat screw 40 under the third control. The control unit 500 may adjust the rotation speed of the flat screw 40 in advance by executing the pressure adjusting processing while discharging the shaping material from the nozzle hole 69 toward the waste material collection box 600.

According to the three-dimensional shaping device 100b of the present embodiment described above, the control unit 500 adjusts the rotation speed of the flat screw 40 in advance by executing the pressure adjusting processing after the maintenance operation and before restarting the shaping of the three-dimensional shaped object. Therefore, it is possible to stabilize the discharge of the shaping material from the nozzle hole 69 after the shaping of the three-dimensional shaped object is restarted. In particular, according to the present embodiment, the control unit 500 adjusts the rotation speed of the flat screw 40 in advance by executing the pressure adjusting processing after the maintenance operation and before restarting the shaping of the three-dimensional shaped object, and rotates the flat screw 40 at the rotation speed adjusted in advance without executing the pressure adjusting processing during the period from when the shaping of the three-dimensional shaped object is restarted to when the shaping is paused. Therefore, the discharge of the shaping material from the nozzle hole 69 can be stabilized without complicating the processing during the shaping of the three-dimensional shaped object.

C. Third Embodiment

Figure 16:
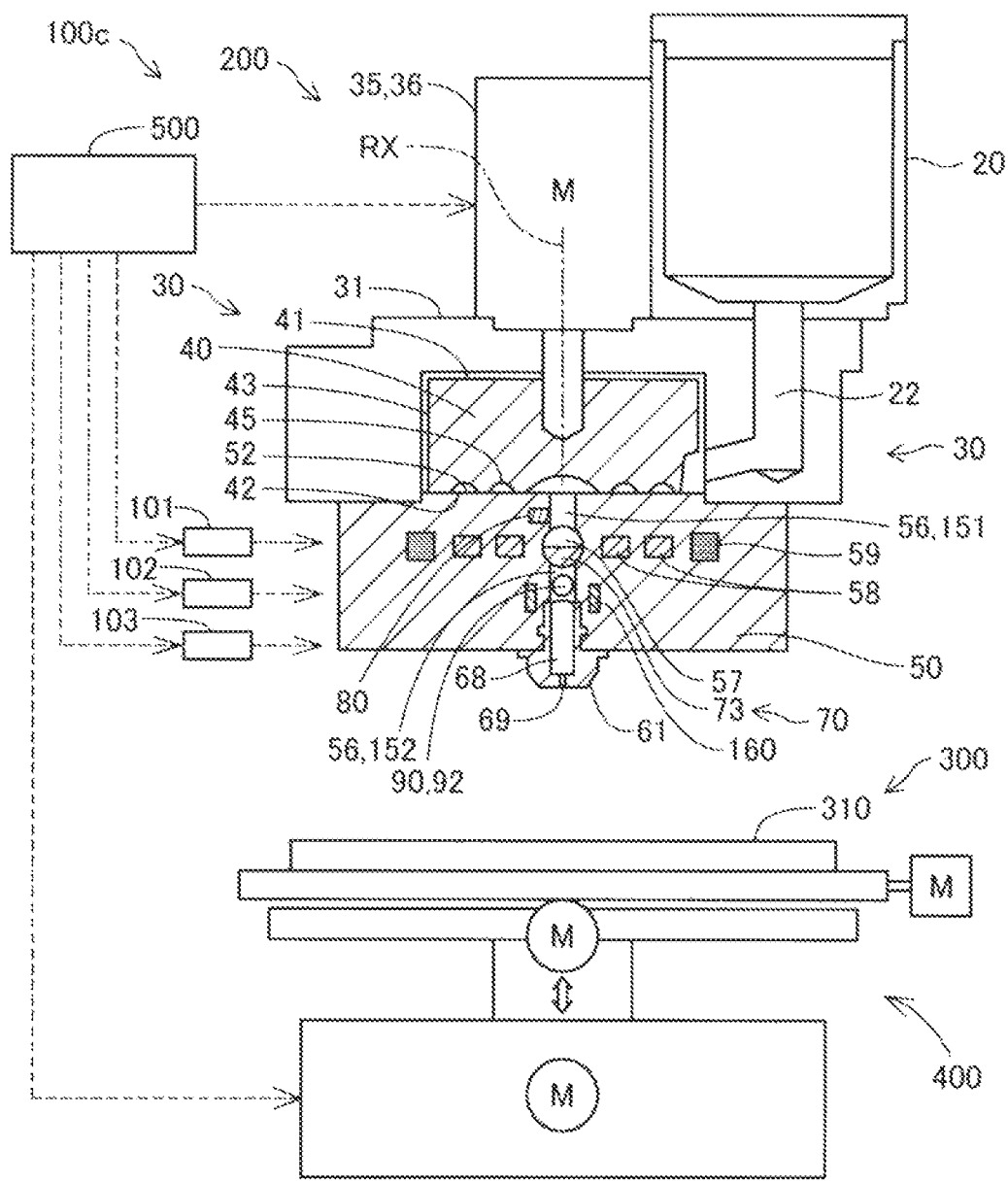
FIG. 16 is a diagram showing a schematic configuration of a three-dimensional shaping device according to a third embodiment.

FIG. 16 is a diagram showing a schematic configuration of a three-dimensional shaping device 100c according to a third embodiment. The three-dimensional shaping device 100c according to the third embodiment is different from the first embodiment in that a second heater 160 is provided. Other configurations are the same as those of the first embodiment shown in FIG. 1 unless otherwise specified.

The second heater 160 is provided in an outer periphery of the second flow path 152 in the barrel 50. The second heater 160 heats the shaping material in the second flow path 152. A temperature of the second heater 160 is controlled by the control unit 500. The second heater 160 may also be referred to as a heating portion.

In the present embodiment, in the pressure adjusting processing, the control unit 500 adjusts the temperature of the second heater 160 instead of the rotation of the flat screw 40. When it is determined in step S240 shown in FIG. 11 that the average pressure value Pave is greater than the target pressure value Pb, in step S245, the control unit 500 increases the temperature of the second heater 160 instead of decreasing the rotation speed of the flat screw 40. When the temperature of the second heater 160 is increased, the fluidity of the shaping material increases, and thus the pressure value P measured by the pressure measuring portion 80 is reduced. Therefore, the pressure value P approaches the target pressure value Pb. On the other hand, when it is determined in step S240 that the average pressure value Pave is smaller than the target pressure value Pb, in step S250, the control unit 500 decreases the temperature of the second heater 160 instead of increasing the rotation speed of the flat screw 40. When the temperature of the second heater 160 is decreased, the fluidity of the shaping material decreases, and thus the pressure value P measured by the pressure measuring portion 80 is increased. Therefore, the pressure value P approaches the target pressure value Pb. In step S245 or step S250, the control unit 500 may adjust both the rotation of the flat screw 40 and the temperature of the second heater 160. In the pressure adjusting processing described in the second embodiment, the control unit 500 may adjust the temperature of the second heater 160 instead of the rotation of the flat screw 40, or may adjust both the rotation of the flat screw 40 and the temperature of the second heater 160.

According to the three-dimensional shaping device 100c of the present embodiment described above, the control unit 500 can prevent the variation of the pressure value P by adjusting the temperature of the second heater 160. Therefore, the discharge of the shaping material from the nozzle hole 69 can be stabilized.

D. Other Embodiments (D1) In the pressure adjusting processing of the embodiments described above, the control unit 500 may adjust the rotation speed of the flat screw 40 without using the pressure value P measured by the pressure measuring portion 80 during a period when the plunger 93 of the suction portion 90 is driven to suck the shaping material of the second flow path 152 into the cylinder 92. The control unit 500 may adjust the rotation of the flat screw 40 without using the pressure value P measured by the pressure measuring portion 80 during a period when the plunger 93 of the suction portion 90 is driven to push the shaping material in the cylinder 92 out into the second flow path 152. When the valve portion 73 is open, the pressure of the shaping material in the first flow path 151 tends to vary due to the driving of the plunger 93. Therefore, the discharge of the shaping material from the nozzle hole 69 can be more reliably stabilized by adjusting the rotation speed of the flat screw 40 without using the pressure value P measured during the period when the plunger 93 is driven.

(D2) In the pressure adjusting processing of the embodiments described above, the control unit 500 may not use the moving average of the pressure values P acquired from the pressure measuring portion 80. For example, in step S225 shown in FIG. 11, the control unit 500 calculates the average pressure value Pave by dividing the total value $(P_1+P_2+P_3+ \ldots +P_n)$ from the first acquired pressure value $P_1$ to the n-th acquired pressure value $P_n$ by the number of samples N from $P_1$ to $P_n$, and adjusts the rotation speed of the flat screw 40 using the calculated average pressure value Pave. Thereafter, the control unit 500 may reset the stored values from the first acquired pressure value $P_1$ to the n-th acquired pressure value $P_n$, calculate the average pressure value Pave by dividing a total value $(P_{n+1}+P_{n+2}+P_{n+3}+ \ldots +P_{n+n})$ from the (n+1)-th acquired pressure value $P_{n+1}$ to an (n+n)-th acquired pressure value $P_{n+n}$ by the number of samples N, and adjust the rotation speed of the flat screw 40 using the calculated average pressure value Pave. The control unit 500 may adjust the rotation speed of the flat screw 40 by using the pressure value P as it is without averaging the pressure values P acquired from the pressure measuring portion 80.

(D3) In the pressure adjusting processing of the embodiments described above, when the average pressure value Pave exceeds the target pressure value Pb, the control unit 500 may decrease the rotation speed of the flat screw 40, and when the average pressure value Pave falls below the target pressure value Pb, the control unit 500 may increase the rotation speed of the flat screw 40. For example, by setting the pressure tolerance ΔP to 0, when the average pressure value Pave exceeds the target pressure value Pb, the control unit 500 can decrease the rotation speed of the flat screw 40, and when the average pressure value Pave falls below the target pressure value Pb, the control unit 500 can increase the rotation speed of the flat screw 40. In addition, by omitting the processing of step S230 shown in FIG. 11, when the average pressure value Pave exceeds the target pressure value Pb, the control unit 500 can decrease the rotation speed of the flat screw 40, and when the average pressure value Pave falls below the target pressure value Pb, the control unit 500 can increase the rotation speed of the flat screw 40. When the pressure value P, instead of the average pressure value Pave, exceeds the target pressure value Pb, the control unit 500 may decrease the rotation speed of the flat screw 40, and when the pressure value P falls below the target pressure value Pb, the control unit 500 may increase the rotation speed of the flat screw 40.

(D4) In the pressure adjusting processing of the embodiments described above, in step S230 of FIG. 11, when the average pressure value Pave is equal to or less than the first threshold value obtained by adding the pressure tolerance ΔP to the target pressure value Pb and is equal to or more than the second threshold value obtained by subtracting the pressure tolerance ΔP from the target pressure value Pb, the control unit 500 determines that the average pressure value Pave is within the allowable range. That is, the control unit 500 sets the first threshold value and the second threshold value such that an absolute value of a difference between the first threshold value and the target pressure value Pb is the same as an absolute value of a difference between the second threshold value and the target pressure value Pb. In contrast, the control unit 500 may set the first threshold value and the second threshold value such that the absolute value of the difference between the first threshold value and the target pressure value Pb is greater than the absolute value of the difference between the second threshold value and the target pressure value Pb, or may set the first threshold value and the second threshold value such that the absolute value of the difference between the first threshold value and the target pressure value Pb is smaller than the absolute value of the difference between the second threshold value and the target pressure value Pb.

(D5) In the pressure adjusting processing of the embodiments described above, when it is determined in step S210 of FIG. 11 that the valve portion 73 is not open, the control unit 500 does not adjust the rotation speed of the flat screw 40. In contrast, when it is determined in step S210 that the valve portion 73 is not open, the control unit 500 may adjust the rotation speed of the flat screw 40. For example, in step S205, the control unit 500 acquires a first pressure tolerance ΔP1 and a second pressure tolerance ΔP2 greater than the first pressure tolerance ΔP1, and when it is determined in step S210 that the valve portion 73 is open, the control unit 500 proceeds to step S215. Thereafter, in step S230, when the average pressure value Pave is equal to or less than a first threshold value obtained by adding the first pressure tolerance ΔP1 to the target pressure value Pb and is equal to or more than a second threshold value obtained by subtracting the first pressure tolerance ΔP1 from the target pressure value Pb, the control unit 500 determines that the average pressure value Pave is within the allowable range. On the other hand, when it is determined in step S210 that the valve portion 73 is not open, the control unit 500 proceeds to step S215. Thereafter, in step S230, when the average pressure value Pave is equal to or less than a third threshold value obtained by adding the second pressure tolerance ΔP2 to the target pressure value Pb and is equal to or more than a fourth threshold value obtained by subtracting the second pressure tolerance ΔP2 from the target pressure value Pb, the control unit 500 determines that the average pressure value Pave is within the allowable range. A difference between the third threshold value and the fourth threshold value is greater than a difference between the first threshold value and the second threshold value. Therefore, in the example described above, when it is determined that the valve portion 73 is not open, the rotation speed of the flat screw 40 is less likely to be changed as compared with the case when it is determined that the valve portion 73 is open. That is, the degree of adjustment of the rotation of the flat screw 40 when it is determined that the valve portion 73 is not open can be made smaller than the degree of adjustment of the rotation of the flat screw 40 when it is determined that the valve portion 73 is open. In the example described above, the first pressure tolerance ΔP1 may be set to 0, and the second pressure tolerance ΔP2 may be set to a value greater than the first pressure tolerance ΔP1.

(D6) In the pressure adjusting processing of the embodiments described above, when it is determined in step S210 of FIG. 11 that the valve portion 73 is not open, the control unit 500 does not adjust the rotation speed of the flat screw 40. In contrast, when it is determined in step S210 that the valve portion 73 is not open, the control unit 500 may adjust the rotation speed of the flat screw 40. For example, the control unit 500 acquires a first collection time T1 and a second collection time T2 longer than the first collection time T1 in step S205, and proceeds to step S215 when it is determined in step S210 that the valve portion 73 is open. By repeating the processing from step S210 to step S220, the control unit 500 acquires N samples of pressure values P within the first collection time T1. Thereafter, in step S225, the control unit 500 uses the N samples of pressure values P to calculate a first average pressure value Pave1. On the other hand, when it is determined in step S210 that the valve portion 73 is not open, the control unit 500 proceeds to step S215. By repeating the processing from step S210 to step S220, the control unit 500 acquires M samples of pressure values P within the second collection time T2, M being greater than N. Thereafter, in step S225, the control unit 500 uses the M samples of pressure values P to calculate a second average pressure value Pave2. By closing the valve portion 73, even when the measured pressure values P gradually increase, the second average pressure value Pave2 increases more slowly than the first average pressure value Pave1. Therefore, in the example described above, when it is determined that the valve portion 73 is not open, the rotation speed of the flat screw 40 is less likely to be changed as compared with the case when it is determined that the valve portion 73 is open. That is, the degree of adjustment of the rotation of the flat screw 40 when it is determined that the valve portion is not open can be made smaller than the degree of adjustment of the rotation of the flat screw 40 when it is determined that the valve portion 73 is open.

(D7) In the pressure adjusting processing of the second embodiment described above, the control unit 500 executes the pressure adjusting processing after the maintenance operation and before restarting the shaping of the three-dimensional shaped object, and does not execute the pressure adjusting processing during the period from when the shaping of the three-dimensional shaped object is restarted to when the shaping is paused. In contrast, the control unit 500 may execute the pressure adjusting processing also during the period from when the shaping of the three-dimensional shaped object is restarted to when the shaping is paused.

(D8) In the pressure adjusting processing of the embodiments described above, the control unit 500 may adjust the rotation speed of the flat screw 40 by a combination of a feedback control and a feedforward control. For example, the three-dimensional shaping devices 100, 100b, and 100c may be provided with an outside temperature sensor, and the control unit 500 may use the feedforward control using an outside temperature acquired by the outside temperature sensor to adjust the rotation speed of the flat screw 40.

(D9) In the three-dimensional shaping devices 100, 100b, and 100c of the embodiments described above, the plasticization unit 30 includes the flat screw 40 having a flat columnar shape and the barrel 50 having the flat screw facing surface 52. In contrast, the plasticization unit 30 may include an inline screw which has a long shaft-shaped outer shape and in which a spiral groove is formed on a side surface of a shaft, and a barrel having a cylindrical screw facing surface.

(D10) In the three-dimensional shaping devices 100, 100b, and 100c of the embodiments described above, the drive unit 35 includes the drive motor 36 and a transmission, and the drive motor 36 may be coupled with the flat screw 40 via the transmission. In this case, the rotation speed of the flat screw 40 can be switched by switching a speed reduction ratio of the transmission.

(D11) In the three-dimensional shaping devices 100, 100b, and 100c of the embodiments described above, a flow path member having a flow path communicating with the through hole 56 of the barrel 50 and the nozzle flow path 68 may be provided between the barrel 50 and the nozzle 61. The cross hole 57 may be provided in the flow path member instead of the barrel 50. In this case, the valve portion of the discharge amount adjusting mechanism 70 is disposed in the cross hole 57 provided in the flow path member.

(D12) In the three-dimensional shaping devices 100, 100b, and 100c of the embodiments described above, the pressure measuring portion 80 may be provided in the second flow path 152. In this case, the control unit 500 may use pressure of the shaping material in the second flow path 152 measured by the pressure measuring portion 80 to adjust the rotation speed of the flat screw 40.

E. Other Aspects

The present disclosure is not limited to the above-described embodiments, and can be implemented in various aspects without departing from the spirit of the present disclosure. For example, the present disclosure can be implemented by the following aspects. In order to solve some or all of the problems described in the present disclosure, or to achieve some or all of the effects of the present disclosure, technical characteristics in the above embodiments corresponding to the technical characteristics in each of the embodiments described below can be appropriately replaced or combined. If the technical characteristics are not described as essential in the present description, they can be deleted as appropriate.

(1) According to a first aspect of the present disclosure, a three-dimensional shaping device is provided. The three-dimensional shaping device includes: a plasticization unit having a screw and configured to plasticize a material into a shaping material using the rotating screw; a drive unit configured to rotate the screw; a supply flow path communicating with the plasticization unit and through which the shaping material flows; a nozzle communicating with the supply flow path and configured to discharge the shaping material; a discharge amount adjusting mechanism having a valve portion provided in the supply flow path, and configured to switch between stop and restart of discharging of the shaping material from the nozzle by driving the valve portion; a pressure measuring portion configured to measure a pressure of the shaping material in the supply flow path between the plasticization unit and the valve portion; and a control unit configured to adjust rotation of the screw by controlling the drive unit according to a measured value of the pressure measured by the pressure measuring portion. The control unit controls the drive unit under a first control during a period when the discharging of the shaping material from the nozzle is not stopped by the discharge amount adjusting mechanism, and controls the drive unit under a second control during a period when the discharging of the shaping material from the nozzle is stopped by the discharge amount adjusting mechanism, and a degree of adjustment of the rotation of the screw under the second control is smaller than a degree of adjustment of the rotation of the screw under the first control.

According to the three-dimensional shaping device of this aspect, the control unit controls the drive unit under the first control with a large degree of adjustment of the rotation of the screw during the period when the discharge of the shaping material from the nozzle is not stopped by the discharge amount adjusting mechanism, and controls the drive unit under the second control with a small degree of adjustment of the rotation of the screw during the period when the discharge of the shaping material from the nozzle is stopped by the discharge amount adjusting mechanism. Therefore, during the period when the discharge of the shaping material from the nozzle is stopped, it is difficult to adjust the rotation of the screw even when the pressure of the shaping material varies, so that when the discharge of the shaping material from the nozzle is restarted, the unstable discharge of the shaping material from the nozzle can be prevented.

(2) In the three-dimensional shaping device of the above aspect, the control unit may change a rotation speed of the screw according to the measured value under the first control, and rotate the screw at a preset rotation speed under the second control.

According to the three-dimensional shaping device of this aspect, the degree of adjustment of the rotation of the screw under the second control can be made smaller than the degree of adjustment of the rotation of the screw under the first control.

(3) In the three-dimensional shaping device of the above aspect, the control unit may, under the first control, decrease the rotation of the screw when the measured value exceeds a target value of the pressure, and increase the rotation of the screw when the measured value falls below the target value.

According to the three-dimensional shaping device of this aspect, the measured value of the pressure of the shaping material under the first control can approach the target value.

(4) In the three-dimensional shaping device of the above aspect, the control unit may, under the first control, decrease the rotation of the screw when the measured value exceeds a first threshold value which is greater than a target value of the pressure, increase the rotation of the screw when the measured value falls below a second threshold value which is smaller than the target value, and not adjust the rotation of the screw when the measured value is equal to or less than the first threshold value and equal to or more than the second threshold value.

According to the three-dimensional shaping device of this aspect, when a pressure value exceeds the first threshold value or falls below the second threshold value, the control unit adjusts the rotation of the screw. Therefore, it is possible to prevent the unstable discharge of the shaping material from the nozzle with the adjustment on the rotation of the screw being repeated due to a small variation in the pressure.

(5) In the three-dimensional shaping device of the above aspect, under the first control, the control unit may calculate a moving average value of the pressure using a plurality of measured values, and adjust the rotation of the screw by controlling the drive unit according to the moving average value.

According to the three-dimensional shaping device of this aspect, since the control unit adjusts the rotation of the screw by using the moving average value of the pressure of the shaping material, it is possible to prevent the rotation of the screw from becoming unstable due to a sudden variation in pressure. Therefore, the unstable discharge of the shaping material from the nozzle can be further prevented.

(6) In the three-dimensional shaping device of the above aspect, the screw of the plasticization unit may be a flat screw having a groove forming surface on which a groove through which the material is supplied is formed, and the plasticization unit may include a barrel having a facing surface which faces the groove forming surface, with an opening portion of the supply flow path being provided on the facing surface, and plasticize the material between the flat screw and the barrel into the shaping material, such that the shaping material flows from the opening portion into the supply flow path.

According to the three-dimensional shaping device of this aspect, since the material can be plasticized using a small flat screw, it is possible to reduce a size of the three-dimensional shaping device.

(7) In the three-dimensional shaping device of the above aspect, the valve portion may have a recessed portion configured to communicate with the plasticization unit and the nozzle, and the discharge amount adjusting mechanism may rotate the valve portion about a rotation shaft intersecting a direction from the plasticization unit toward the nozzle to change a position of the recessed portion, so that a flow path cross-sectional area of the supply flow path is changed to adjust a flow rate of the shaping material to be supplied to the nozzle.

According to the three-dimensional shaping device of this aspect, switching between the stop and restart of the discharge of the shaping material from the nozzle can be implemented with a simple configuration.

(8) In the three-dimensional shaping device of the above aspect, a suction portion configured to suck the shaping material is coupled to the supply flow path between the valve portion and the nozzle, and the control unit may adjust, under the first control, the rotation of the screw by controlling the drive unit without using the measured value which is measured during a period when the shaping material is sucked by the suction portion.

According to the three-dimensional shaping device of this aspect, stringing of the shaping material from the nozzle can be prevented by sucking the shaping material of the supply flow path between the valve portion and the nozzle using the suction portion, and the rotation of the screw is adjusted without using the pressure value of the shaping material measured during the period when the shaping material is sucked by the suction portion, so that it is possible to prevent the rotation of the screw from becoming unstable.

(9) In the three-dimensional shaping device of the above aspect, the control unit may adjust, under the first control, the rotation of the screw by controlling the drive unit referring to a table in which a relationship between a rotation speed of the screw and the measured value is expressed.

According to the three-dimensional shaping device of this aspect, even when the relationship between the rotation speed of the screw and the pressure of the shaping material is non-linear, the discharge of the shaping material from the nozzle can be stabilized.

(10) The three-dimensional shaping device of the above aspect further includes a heating portion configured to heat the shaping material of the supply flow path between the valve portion and the nozzle, in which the control unit may adjust, under at least one of the first control and the second control, a temperature of the heating portion according to the measured value.

According to the three-dimensional shaping device of this aspect, fluidity of the shaping material discharged from the nozzle can be adjusted by adjusting the temperature of the heating portion by the control unit. Therefore, the discharge of the shaping material from the nozzle can be further stabilized.

(11) In the three-dimensional shaping device of the above aspect, the control unit may control the drive unit under a third control during a period after a maintenance operation of the three-dimensional shaping device and before starting shaping a three-dimensional shaped object, among a period when the discharge of the shaping material from the nozzle is not stopped by the discharge amount adjusting mechanism, and the degree of adjustment of the rotation of the screw under the first control may be smaller than a degree of adjustment of the rotation of the screw under the third control.

According to the three-dimensional shaping device of this aspect, the control unit adjusts the rotation of the screw in advance during the period after the maintenance operation and before starting shaping a three-dimensional shaped object, and then starts shaping the three-dimensional shaped object. Therefore, the discharge of the shaping material from the nozzle can be stabilized.

(12) In the three-dimensional shaping device of the above aspect, the control unit may, under the first control, decrease the rotation of the screw when the measured value exceeds a first threshold value which is greater than a target value of the pressure, and increase the rotation of the screw when the measured value falls below a second threshold value which is smaller than the target value, and under the second control, decrease the rotation of the screw when the measured value exceeds a third threshold value which is greater than the target value, and increase the rotation of the screw when the measured value falls below a fourth threshold value which is smaller than the target value, and a difference between the third threshold value and the fourth threshold value is greater than a difference between the first threshold value and the second threshold value.

According to the three-dimensional shaping device of this aspect, the adjustment of the rotation of the screw under the first control is less likely to be started as compared with that under the second control. Therefore, the degree of adjustment of the rotation of the screw under the second control can be made smaller than the degree of adjustment of the rotation of the screw under the first control.

(13) In the three-dimensional shaping device of the above aspect, the control unit may, under the first control, decrease the rotation of the screw when the measured value exceeds a target value of the pressure, and increase the rotation of the screw when the measured value falls below the target value, and under the second control, decrease the rotation of the screw when the measured value exceeds a third threshold value which is greater than the target value, and increase the rotation of the screw when the measured value falls below a fourth threshold value which is smaller than the target value.

According to the three-dimensional shaping device of this aspect, the adjustment of the rotation of the screw under the first control is less likely to be started as compared with that under the second control. Therefore, the degree of adjustment of the rotation of the screw under the second control can be made smaller than the degree of adjustment of the rotation of the screw under the first control.

(14) In the three-dimensional shaping device of the above aspect, under the first control and the second control, the control unit may calculate a moving average value of the pressure using a plurality of measured values, and adjust the rotation of the screw by controlling the drive unit according to the moving average value, and the number of samples of measured values used to calculate the moving average value under the second control is larger than the number of samples of measured values used to calculate the moving average value under the first control.

According to the three-dimensional shaping device of this aspect, the adjustment of the rotation of the screw under the first control is less likely to be started as compared with that under the second control. Therefore, the degree of adjustment of the rotation of the screw under the second control can be made smaller than the degree of adjustment of the rotation of the screw under the first control.

The present disclosure may be implemented in various forms other than the three-dimensional shaping device. For example, the present disclosure may be implemented in forms such as a method for controlling a three-dimensional shaping device and a method for manufacturing a three-dimensional shaped object.

What is claimed is:

1. A three-dimensional shaping device, comprising:
   a plasticization unit having a screw and configured to plasticize a material into a shaping material using the screw;
   a drive unit configured to rotate the screw;
   a supply flow path communicating with the plasticization unit and through which the shaping material flows;
   a nozzle communicating with the supply flow path and configured to discharge the shaping material;
   a discharge amount adjusting mechanism having a valve portion provided in the supply flow path, and configured to switch between stop and restart discharging of the shaping material from the nozzle by driving the valve portion;
   a suction portion coupled to the supply flow path between the valve portion and the nozzle, the suction portion being configured to suck the shaping material;
   a pressure measuring portion configured to measure a pressure of the shaping material in the supply flow path; and
   a control unit configured to adjust rotation of the screw by controlling the drive unit according to a measured value of the pressure measured by the pressure measuring portion, wherein the screw of the plasticization unit is a flat screw having a groove forming surface on which a groove is formed through which the material is supplied, the plasticization unit includes a barrel having a facing surface which faces the groove forming surface, with an opening portion of the supply flow path being provided on the facing surface, and is configured to plasticize the material between the flat screw and the barrel into the shaping material, such that the shaping material flows from the opening portion into the supply flow path, the groove includes a first groove and a second groove, a depth of the first groove is greater than a depth of the second groove, and the second groove is located closer to a center of the flat screw than the first groove, and the control unit adjusts the rotation of the screw by controlling the drive unit without using the measured value which is measured during a period when the shaping material is sucked by the suction portion, wherein the control unit controls the drive unit under a first control during a period when the discharging of the shaping material from the nozzle is not stopped by the discharge amount adjusting mechanism, and controls the drive unit under a second control during a period when the discharging of the shaping material from the nozzle is stopped by the discharge amount adjusting mechanism, and a degree of adjustment of the rotation of the screw under the second control is smaller than a degree of adjustment of the rotation of the screw under the first control.

2. The three-dimensional shaping device according to claim 1, wherein the control unit is configured to change a rotation speed of the screw according to the measured value under the first control, and rotate the screw at a preset rotation speed under the second control.

3. The three-dimensional shaping device according to claim 1, wherein
   the control unit is configured to,
      decrease the rotation of the screw when the measured value exceeds a target value of the pressure, and
      increase the rotation of the screw when the measured value falls below the target value.

4. The three-dimensional shaping device according to claim 1, wherein
   the control unit is configured to,
      decrease the rotation of the screw when the measured value exceeds a first threshold value which is greater than a target value of the pressure,
      increase the rotation of the screw when the measured value falls below a second threshold value which is smaller than the target value, and
      not adjust the rotation of the screw when the measured value is equal to or less than the first threshold value and equal to or more than the second threshold value.

5. The three-dimensional shaping device according to claim 1, wherein
   the control unit calculates a moving average value of the pressure using a plurality of measured values, and adjusts the rotation of the screw by controlling the drive unit according to the moving average value.

6. The three-dimensional shaping device according to claim 1, wherein
   the valve portion has a recessed portion configured to communicate with the plasticization unit and the nozzle, and
   the discharge amount adjusting mechanism rotates the valve portion about a rotation shaft intersecting a direction from the plasticization unit toward the nozzle to change a position of the recessed portion, so that a flow path cross-sectional area of the supply flow path is changed to adjust a flow rate of the shaping material to be supplied to the nozzle.

7. The three-dimensional shaping device according to claim 1, wherein
   the control unit adjusts the rotation of the screw by controlling the drive unit referring to a table in which a relationship between a rotation speed of the screw and the measured value is expressed.

8. The three-dimensional shaping device according to claim 1, further comprising:
   a heating portion configured to heat the shaping material of the supply flow path between the valve portion and the nozzle, wherein
   the control unit adjusts a temperature of the heating portion according to the measured value.

9. The three-dimensional shaping device according to claim 1, wherein the control unit controls the drive unit under a third control during a period after a maintenance operation of the three-dimensional shaping device and before starting shaping a three-dimensional shaped object, among a period when the discharge of the shaping material from the nozzle is not stopped by the discharge amount adjusting mechanism, and the degree of adjustment of the rotation of the screw under the first control is smaller than a degree of adjustment of the rotation of the screw under the third control.

10. The three-dimensional shaping device according to claim 1, wherein the control unit is configured to, under the first control, decrease the rotation of the screw when the measured value exceeds a first threshold value which is greater than a target value of the pressure, and increase the rotation of the screw when the measured value falls below a second threshold value which is smaller than the target value, and under the second control, decrease the rotation of the screw when the measured value exceeds a third threshold value which is greater than the target value, and increase the rotation of the screw when the measured value falls below a fourth threshold value which is smaller than the target value, and a difference between the third threshold value and the fourth threshold value is greater than a difference between the first threshold value and the second threshold value.

11. The three-dimensional shaping device according to claim 1, wherein the control unit is configured to, under the first control, decrease the rotation of the screw when the measured value exceeds a target value of the pressure, and increase the rotation of the screw when the measured value falls below the target value, and under the second control, decrease the rotation of the screw when the measured value exceeds a third threshold value which is greater than the target value, and increase the rotation of the screw when the measured value falls below a fourth threshold value which is smaller than the target value.

12. The three-dimensional shaping device according to claim 1, wherein under the first control and the second control, the control unit calculates a moving average value of the pressure using a plurality of measured values, and adjusts the rotation of the screw by controlling the drive unit according to the moving average value, and the number of samples of measured values used to calculate the moving average value under the second control is larger than the number of samples of measured values used to calculate the moving average value under the first control.

\* \* \* \* \*